United States Patent
Shimizu et al.

(10) Patent No.: US 11,201,649 B2
(45) Date of Patent: Dec. 14, 2021

(54) BASE STATION DEVICE, TERMINAL DEVICE, COMMUNICATION SYSTEM, AND COMMUNICATION CONTROL METHOD

(71) Applicant: PANASONIC CORPORATION, Osaka (JP)

(72) Inventors: Noriyuki Shimizu, Kanagawa (JP); Maho Takita, Kanagawa (JP); Hiroaki Asano, Kanagawa (JP); Hideki Shingu, Tokyo (JP)

(73) Assignee: PANASONIC CORPORATION, Osaka (JP)

( * ) Notice: Subject to any disclaimer, the term of this patent is extended or adjusted under 35 U.S.C. 154(b) by 3 days.

(21) Appl. No.: 16/636,194

(22) PCT Filed: Jun. 6, 2018

(86) PCT No.: PCT/JP2018/021764
§ 371 (c)(1),
(2) Date: Feb. 3, 2020

(87) PCT Pub. No.: WO2019/031044
PCT Pub. Date: Feb. 14, 2019

(65) Prior Publication Data
US 2020/0382184 A1    Dec. 3, 2020

(30) Foreign Application Priority Data
Aug. 10, 2017 (JP) .............................. JP2017-155457

(51) Int. Cl.
*H04B 17/24* (2015.01)
*H04B 7/06* (2006.01)
(Continued)

(52) U.S. Cl.
CPC ............. *H04B 7/061* (2013.01); *H04B 17/24* (2015.01); *H04B 17/318* (2015.01); *H04W 28/0289* (2013.01)

(58) Field of Classification Search
CPC ...... H04B 17/24; H04B 17/318; H04B 7/024; H04B 7/061; H04B 7/0695; H04B 7/088; H04W 16/28; H04W 28/0289
See application file for complete search history.

(56) References Cited

U.S. PATENT DOCUMENTS

2009/0207078 A1* 8/2009 Fletcher ................. H04B 7/043
342/377
2017/0104517 A1    4/2017 Kakishima et al.
(Continued)

FOREIGN PATENT DOCUMENTS

JP    2015-185953    10/2015
JP    2016-143916    8/2016

OTHER PUBLICATIONS

International Search Report (ISR) issued in International Pat. Appl. No. PCT/JP2018/021764, dated Aug. 21, 2018.
(Continued)

*Primary Examiner* — Minh Trang T Nguyen
(74) *Attorney, Agent, or Firm* — Greenblum & Bernstein, P.L.C.

(57) ABSTRACT

In order to prospectively avoid communication failures or reduction in throughput of each user terminal, thereby improving users' satisfaction with communication service, a base station is configured to control wireless communication with a terminal device by using any of multiple transmission beams formed by the base station or those formed by another base station and includes a wireless communication device and a controller configured to acquire correction information used for correcting a measurement value for evaluating reception status of each transmission beam and cause the
(Continued)

wireless communication device to transmit the correction information to the user terminal so as to thereby promote the user terminal to use, or inhibit the user terminal from using a specific transmission beam.

14 Claims, 18 Drawing Sheets

(51) Int. Cl.
    *H04B 17/318*     (2015.01)
    *H04W 28/02*     (2009.01)

(56) References Cited

U.S. PATENT DOCUMENTS

2017/0311252 A1    10/2017   Takano
2018/0007574 A1*   1/2018   Park .................... H04W 72/042

OTHER PUBLICATIONS

Japanese Office Action dated Oct. 5, 2021 issued in Japanese Patent Application No. 2017-155457, along with corresponding English translation.

* cited by examiner

Fig.5 offset information to be added to broadcast information message beam group and offset value for each beam

| beam ID | 0 | 1 | 2 | 3 | 4 | 5 | 6 | 7 | 8 | 9 |
|---|---|---|---|---|---|---|---|---|---|---|
| beam group ID | 0 | | | | | 1 | | | | |
| offset value | 0dB | | | | | −5dB | | | | |

(A−1)

offset information to be added to message

| # of beams per beam group: 5 |
|---|
| offset value for beam ID=0: 0dB |
| offset value for beam ID=1: −5dB |

(A−2)

offset value for each transmission beam

| beam ID | 0 | 1 | 2 | 3 | 4 | 5 | 6 | 7 | 8 | 9 |
|---|---|---|---|---|---|---|---|---|---|---|
| offset value | 0dB | | | | | | | −50dB | 0dB | | beam set: 0–6, beam set: 7, beam set: 8–9

(B−1)

offset information to be added to message

| beg beam ID: 0 | # of beams with consecutive IDs: 7 | offset value: 0dB |
|---|---|---|
| beg beam ID: 7 | # of beams with consecutive IDs: 1 | offset value: −50dB |
| beg beam ID: 8 | # of beams with consecutive IDs: 2 | offset value: 0dB |

(B−2)

*Fig.6* offset information to be added to measurement-related info message

| beam ID | 7 | 10 |
|---|---|---|
| offset value | 0dB | 15dB |

Fig.7 offset information for cell ID: 5

| beam ID | 0 | 1 | 2 | 3 | 4 | 5 | 6 | 7 | 8 | 9 |
|---|---|---|---|---|---|---|---|---|---|---|
| beam group ID | 0 | | | | | 1 | | | | |
| offset value | 4dB | | | | | 0dB | | | | | offset information for cell ID: 6

| beam ID | 0 | 1 | 2 | 3 | 4 | 5 | 6 | 7 | 8 | 9 |
|---|---|---|---|---|---|---|---|---|---|---|
| beam group ID | 0 | | | | | 1 | | | | |
| offset value | −1dB | | | | | −5dB | | | | | offset information for cell ID: 10

| beam ID | 0 | 1 | 2 | 3 | 4 | 5 | 6 | 7 | 8 | 9 |
|---|---|---|---|---|---|---|---|---|---|---|
| beam group ID | 0 | 1 | | 2 | | 3 | | 4 | | |
| offset value | 0dB | −20dB | | −4dB | | 4dB | | 0dB | | |

Fig.8
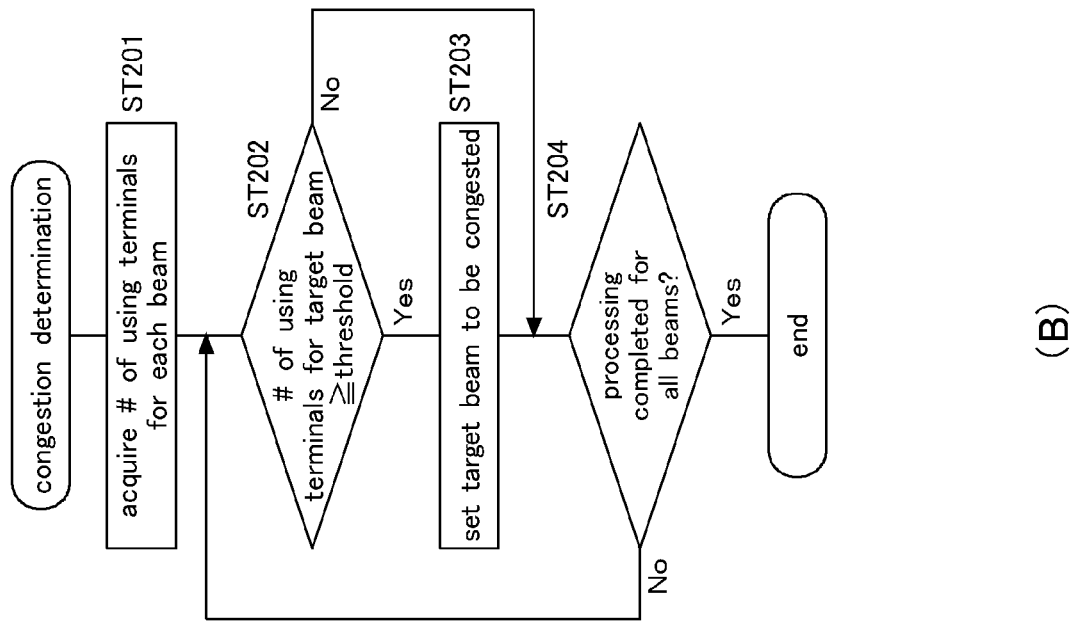
(B)
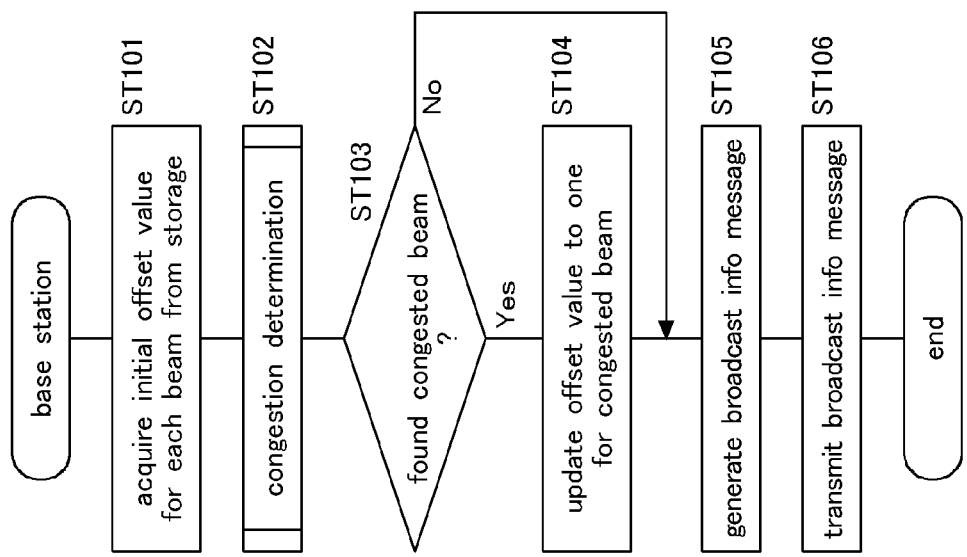
(A)

Fig.16 historical used-beam information

| cell ID | beam ID |
|---|---|
| 1 | 8 |
| 1 | 5 |
| 1 | 0 |
| 1 | 2 |
| 1 | 3 |
| 1 | 7 |
| 2 | 10 |
| 2 | 11 |
| 2 | 15 |

BASE STATION DEVICE, TERMINAL DEVICE, COMMUNICATION SYSTEM, AND COMMUNICATION CONTROL METHOD

TECHNICAL FIELD

The present invention relates to a base station device, a terminal device, a communication system and a communication control method for controlling wireless communication performed by the terminal device by using any of multiple transmission beams formed by the base station device.

BACKGROUND ART

Presently, 5G systems (Fifth generation mobile communication systems) are being considered for introduction into general use in wireless communications. In 5G systems, wireless communication systems enable communications at high transmission capacities of more than 1 Gbps by utilizing high SHF bands or EHF bands. However, since such wireless communications utilizing high frequency bands generally provide short transmission ranges, utilization of a transmission beam forming technique is considered in order to extend the transmission range of such a system.

When a transmission beam forming technique is utilized, a user terminal needs to select a proper transmission beam as necessary when performing communication. Known technologies related to such selection of a transmission beam include selecting a proper transmission beam based on received powers of respective transmission beams at a user terminal (See Patent Document 1). In this case, the wider a formed transmission beam is, the lower a received transmission beam power at a user terminal is. Thus, this prior art technology uses an offset value added to a measurement value of received power of each transmission beam at a user terminal in order to achieve more proper evaluation of the received power at the user terminal for selection of a transmission beam by eliminating effects of a variation of widths of transmission beams on measurement values of received power of transmission beams at the user terminal.

PRIOR ART DOCUMENT (S)

Patent Document(S)

Patent Document 1: JP2015-185953A

SUMMARY OF THE INVENTION

Task to be Accomplished by the Invention

Communication schemes utilizing high frequency bands, which are adopted in 5G systems, can provide communications at high transmission capacities. However, since higher-frequency electromagnetic waves tend to travel in straight lines, such communication schemes involve a problem that, when an obstacle is located on a communication path line, a decrease in communication quality occurs, which can cause communication failures such as communication link disconnection. Moreover, when a lot of user terminals concurrently use one transmission beam, the throughput of each user terminal is reduced. Such communication failures and reduction in throughput of each user terminal can reduce current users' satisfaction with communication service. Accordingly, there is a need for a technology which makes it possible to prospectively avoid reduction in throughput of a user terminal caused due to communication failures by obstruction and communication link congestion.

However, a configuration which only selects a transmission beam based on the received powers of respective transmission beams as the above-described prior art technology, is not capable of prospectively avoiding occurrence of communication failures by obstruction and/or reduction in throughput of each user terminal due to communication link congestion.

The present invention has been made in view of the problem of the prior art, and a primary object of the present invention is to provide a base station device, a terminal device, a communication system and a communication control method, which makes it possible to prospectively avoid occurrence of communication failures by obstruction and/or reduction in throughput of each terminal device due to communication link congestion, thereby improving users' satisfaction with communication service.

Means to Accomplish the Task

An aspect of the present invention provides a base station device configured to control wireless communication performed by a terminal device using any of multiple transmission beams formed by the base station device or another base station device, the base station device comprising: a wireless communication device configured to wirelessly communicate with the terminal device; and a controller configured to acquire correction information used for correcting a measurement value for evaluating reception status of each transmission beam and cause the wireless communication device to transmit the correction information to the terminal device so as to thereby promote the terminal device to use, or inhibit the terminal device from using a specific transmission beam.

Another aspect of the present invention provides a terminal device configured to perform wireless communication with a base station device by using any of multiple transmission beams formed by the base station device, the terminal device comprising: a wireless communication device configured to wirelessly communicate with the base station device; and a controller configured such that, when the wireless communication device receives correction information transmitted from the base station device, the controller corrects a measurement value for evaluating reception status of each transmission beam, and after selection of a transmission beam based on the corrected measurement value, the controller performs wireless communication with the base station device using the selected transmission beam.

Yet another aspect of the present invention provides a communication system in which a terminal derive performs wireless communication with a base station by using any of multiple transmission beams formed by the base station, wherein the base station comprises: a wireless communication device configured to wirelessly communicate with the terminal device; and a controller configured to acquire correction information used for correcting a measurement value for evaluating reception status of each transmission beam and cause the wireless communication device to transmit the correction information to the terminal device so as to thereby promote the terminal device to use, or inhibit the terminal device from using a specific transmission beam, and wherein the terminal device comprises: a terminal wireless communication device configured to wirelessly communicate with the base station device; and a terminal controller configured such that, when the terminal wireless communication device receives the correction information transmitted from the base station device, the terminal controller corrects a measurement value for evaluating reception status of each transmission beam, and after selection of a transmission beam based on the corrected measurement value, the terminal controller performs wireless communication with the base station device using the selected transmission beam.

Yet another aspect of the present invention provides a communication control method for controlling wireless communication performed by a terminal device by using any of multiple transmission beams formed by a base station, comprising: the base station acquiring correction information used for correcting a measurement value for evaluating reception status of each transmission beam and transmitting the correction information to the terminal device so as to thereby promote the terminal device to use, or inhibit the terminal device from using a specific transmission beam; and upon receiving the correction information transmitted from the base station device, the terminal device correcting a measurement value for evaluating reception status of each transmission beam, and after selection of a transmission beam based on the corrected measurement value, the terminal device performing wireless communication with the base station device using the selected transmission beam.

Effect of the Invention

A configuration according to the present invention can promote a terminal device to use a specific transmission beam, or inhibit the terminal device from using the specific transmission beam. As such, the configuration makes it possible to prospectively avoid communication failures and/or reduction in throughput of each terminal device, thereby improving users' satisfaction with communication service.

BRIEF DESCRIPTION OF THE DRAWINGS

FIG. 5 is an explanatory view showing offset information on each offset value to be added to a broadcast information message according to the first embodiment of the present invention;

FIG. 6 is an explanatory view showing offset information on each offset value to be added to a measurement-related information message according to the first embodiment of the present invention;

FIG. 7 is an explanatory view showing offset information on offset values stored in each user terminal 1 according to the first embodiment of the present invention;

FIG. 8 is a flowchart showing an operation procedure of operations performed by a base station 2 when a user terminal 1 newly connects to the base station 2 according to the first embodiment of the present invention;

FIG. 16 is an explanatory view showing historical used-beam information on transmission beams used before according to the fourth embodiment of the present invention;

DESCRIPTION OF THE PREFERRED EMBODIMENT(S)

Figure 1:
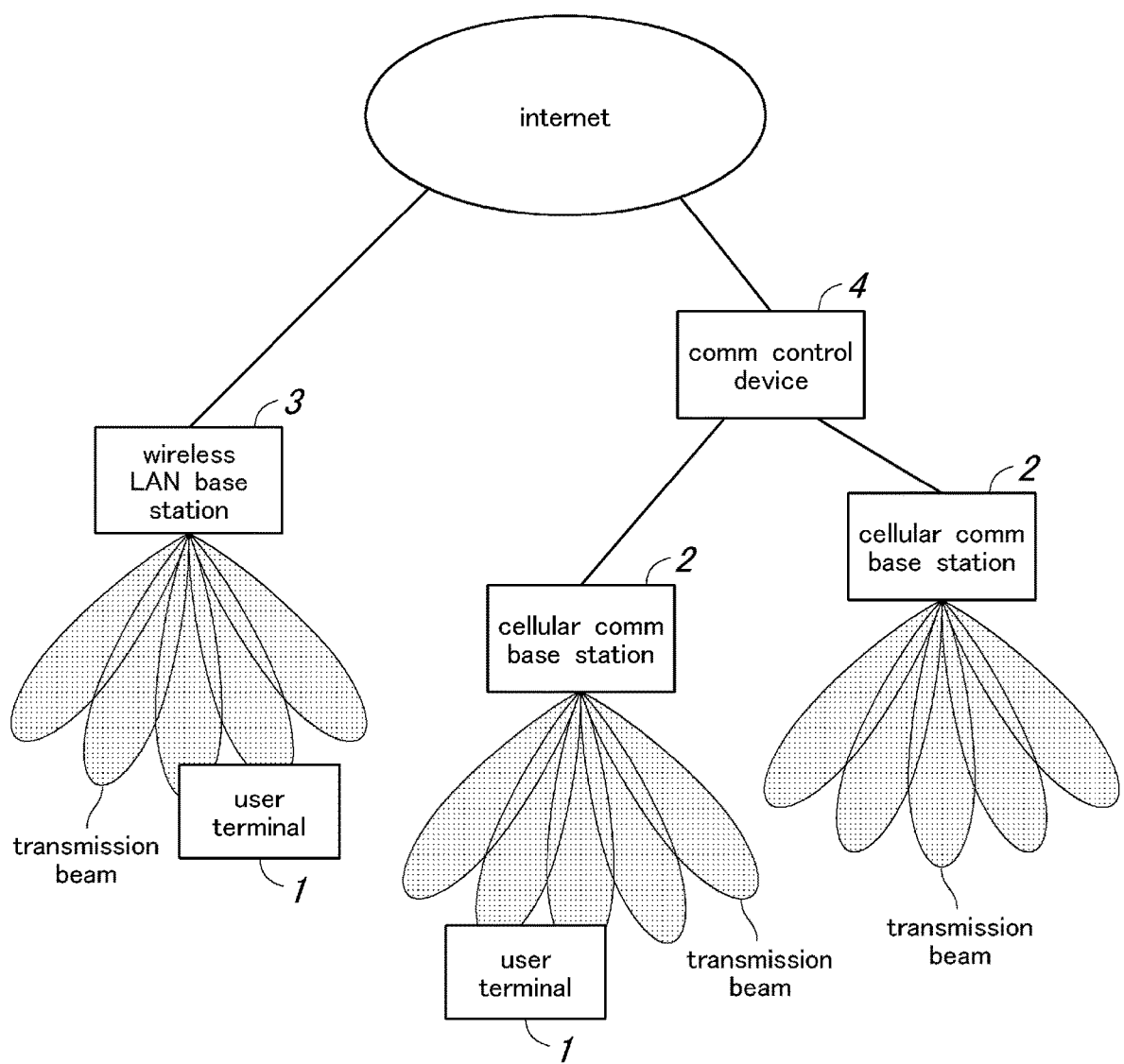
FIG. 1 is a diagram showing a general configuration of a communication system according to a first embodiment of the present invention.

A first aspect of the present invention made to achieve the above-described object is a base station device configured to control wireless communication performed by a terminal device using any of multiple transmission beams formed by the base station device or another base station device, the base station device comprising: a wireless communication device configured to wirelessly communicate with the terminal device; and a controller configured to acquire correction information used for correcting a measurement value for evaluating reception status of each transmission beam and cause the wireless communication device to transmit the correction information to the terminal device so as to thereby promote the terminal device to use, or inhibit the terminal device from using a specific transmission beam.

This configuration can promote a terminal device to use a specific transmission beam, or inhibit the terminal device from using the specific transmission beam. As such, this configuration makes it possible to prospectively avoid communication failures and/or reduction in throughput of each terminal device, thereby improving users' satisfaction with communication service.

A second aspect of the present invention is the base station device of the first aspect, wherein the controller acquires the correction information including an offset value used for increasing or decreasing a measurement value of received power at the terminal device as the measurement value for evaluating reception status of each transmission beam.

In this configuration, by subtracting an offset value from a measurement value of received power of a transmission beam at a terminal device, the base station device can correct the measurement value of received power at the terminal device to be lower than the actual measurement value, thereby decreasing an evaluation of the transmission beam so as to inhibit the terminal device from using the transmission beam. Also, by adding an offset value to a measurement value of received power of a transmission beam at a terminal device, the base station device can correct the measurement value of received power at the terminal device to be higher than the actual measurement value, thereby increasing an evaluation of the transmission beam so as to promote the terminal device to use the transmission beam.

A third aspect of the present invention is the base station device of the first aspect, wherein the controller broadcasts the correction information to all terminal devices present in its coverage area, including one or more terminal devices which are currently not connected to the base station device.

In this configuration, the base station device can promote non-connected terminal devices present within its cell to use a transmission beam, or inhibit the non-connected terminal devices from using the transmission beam. As such, this configuration can restrict terminal devices newly connectable to a specific transmission beam or can lead a terminal device to newly connect to the specific transmission beam.

A fourth aspect of the present invention is the base station device of the first aspect, wherein the controller selects the terminal device among multiple terminal devices currently performing communication by using the specific transmission beam, wherein the selection is made by according to a predetermined condition, and transmits the correction information to the selected terminal device.

This configuration can promote a specific terminal device to use a specific transmission beam, or inhibit the specific terminal device from using the specific transmission beam. As such, this configuration can lead a terminal device currently using a specific transmission beam to change the transmission beam used for communication to another transmission beam, thereby achieving load dispersion and promotion of communication efficiency for a specific transmission beam.

A fifth aspect of the present invention is the base station device of the first aspect, wherein the multiple transmission beams are placed in a predetermined order and grouped into groups each including an equal number of transmission beams, and wherein the controller acquire the correction information which include the number of transmission beams in a group and a corresponding offset value for one or more measurement values of the transmission beams of each group.

This configuration can reduce an amount of data of correction information.

A sixth aspect of the present invention is the base station device of the first aspect, wherein the multiple transmission beams are placed in a predetermined order and grouped into groups each having a corresponding offset value for one or more measurement values of the transmission beams of the group, and wherein the controller acquire the correction information which include an ID of a first transmission beam and a number of the transmission beams for each group, and a corresponding offset value for one or more measurement values of the transmission beams of the group.

This configuration can reduce an amount of data of correction information while maintaining a degree of freedom in determination of offset values.

A seventh aspect of the present invention is the base station device of the first aspect, wherein the controller determines current congestion status of each transmission beam, and acquires the correction information user for correcting each measurement value so as to inhibit the terminal device from using any transmission beam determined to be in congestion status.

This configuration can inhibit a terminal device from using any transmission beam in congestion status to thereby prospectively avoid reduction in throughput of the terminal device. With regard to non-connected terminal devices, this configuration can perform control such that a non-connected terminal device starts communication using another transmission beam which is not in congestion status. When a currently-connected device uses a transmission base in congestion status, this configuration can perform control such that the terminal device changes the transmission beam to another transmission beam which is not in congestion status.

An eighth aspect of the present invention is the base station device of the first aspect, further comprising a storage for storing correction information used for correcting each measurement value so as to inhibit the terminal device from using any transmission beam which is constantly in a bad communication environment, wherein the controller is configured to acquire the correction information stored in the storage.

This configuration inhibits terminal devices from using any transmission beam which is constantly in a bad communication environment, and thus can prospectively avoid communication failures and/or reduction in throughput of each terminal device.

A ninth aspect of the present invention is the base station device of the first aspect, wherein the controller configured to acquire correction information used for correcting each measurement value so as to inhibit the terminal device from using any transmission beam for which a communication environment deteriorates during a current time of day.

This configuration inhibits terminal devices from using any transmission beam for which a communication environment deteriorates during a current time of day and thus can prospectively avoid communication failures and/or reduction in throughput of each terminal device.

A tenth aspect of the present invention is the base station device of the first aspect, wherein the controller is configured to acquire correction information used for correcting each measurement value so as to inhibit the terminal device from using any transmission beam for a traffic lane in which an indication of a traffic signal permits traffic to travel based on traffic signal control information.

This configuration inhibits a terminal device provided in a vehicle traveling under a green light from using any transmission beam for another traffic lane in which traffic is permitted to travel under a green light, and thus can prospectively avoid communication failures.

An eleventh aspect of the present invention is the base station device of the first aspect, wherein the controller is configured to acquire correction information used for correcting each measurement value so as to inhibit the terminal device from using any transmission beam which is directed towards sky by reflection.

This configuration inhibits a terminal device provided in a flying object from using any transmission beam directed towards sky by reflection, and thus can prospectively avoid communication failures.

A twelfth aspect of the present invention is the base station device of the first aspect, wherein the controller is configured to acquire correction information used for correcting each measurement value such that, when the base station device is located on a rear side of a moving direction of a currently-connected terminal device, the controller promotes the terminal device to use a transmission beam formed by an adjacent base station device located on a front side of the moving direction of the currently-connected terminal device, or inhibits the terminal device from using any transmission beam formed by the base station device.

This configuration enables a currently-communicating terminal device to change the transmission beam to be used to a transmission beam of an adjacent base station device before communication failures occur.

A twelfth aspect of the present invention is the base station device of the twelfth aspect, further comprising a storage for storing information on past transmission beams used before as historical used-beam information, wherein the controller is configured to acquire correction information used for correcting each measurement value such that, when the controller determines, based on the historical used-beam information, that the currently-connected terminal device uses a transmission beam formed closest to a coverage of the adjacent base station device, the controller promotes the terminal device to use a transmission beam formed by the adjacent base station device, or inhibits the terminal device from using any transmission beam formed by the base station device.

This configuration enables a currently-communicating terminal device to change the transmission beam to be used to a transmission beam of an adjacent base station device before communication failures occur without a need to acquire information on a moving direction of the terminal device.

A fourteenth aspect of the present invention is a terminal device configured to perform wireless communication with a base station device by using any of multiple transmission beams formed by the base station device, the terminal device comprising: a wireless communication device configured to wirelessly communicate with the base station device; and a controller configured such that, when the wireless communication device receives correction information transmitted from the base station device, the controller corrects a measurement value for evaluating reception status of each transmission beam, and after selection of a transmission beam based on the corrected measurement value, the controller performs wireless communication with the base station device using the selected transmission beam.

This configuration makes it possible to prospectively avoid communication failures and/or reduction in throughput of each terminal device, thereby improving users' satisfaction with communication service in the same manner as the first aspect of the present invention.

A fifteenth aspect of the present invention is the terminal device of the fourteenth aspect, further comprising a storage for storing the correction information received from the base station device, wherein the controller is configured such that, when losing the transmission beam currently used for communication, the controller corrects the measurement value based on the correction information stored in the storage.

In this configuration, even when a terminal device loses the transmission beam currently used for communication and thus becomes unable to acquire correction information from the bases station device, the terminal device can correct a measurement value by using correction information stored in the storage. When new correction information is provided from the base station device, the terminal device can update the correction information in the storage.

A sixteenth aspect of the present invention is the terminal device of the fifteenth aspect, wherein the controller deletes the correction information stored in the storage after a lapse of a predetermined data retention period.

This configuration can prevent a wasteful use of a storage capacity of the storage by unnecessary correction information. Preferably, a data retention period is provided to a terminal device form the base station.

A seventeenth aspect of the present invention is a communication system in which a terminal derive performs wireless communication with a base station by using any of multiple transmission beams formed by the base station, wherein the base station comprises: a wireless communication device configured to wirelessly communicate with the terminal device; and a controller configured to acquire correction information used for correcting a measurement value for evaluating reception status of each transmission beam and cause the wireless communication device to transmit the correction information to the terminal device so as to thereby promote the terminal device to use, or inhibit the terminal device from using a specific transmission beam, and wherein the terminal device comprises: a terminal wireless communication device configured to wirelessly communicate with the base station device; and a terminal controller configured such that, when the terminal wireless communication device receives the correction information transmitted from the base station device, the terminal controller corrects a measurement value for evaluating reception status of each transmission beam, and after selection of a transmission beam based on the corrected measurement value, the terminal controller performs wireless communication with the base station device using the selected transmission beam.

This configuration makes it possible to prospectively avoid communication failures and/or reduction in throughput of each terminal device, thereby improving users' satisfaction with communication service in the same manner as the first aspect of the present invention.

An eighteenth aspect of the present invention is a communication control method for controlling wireless communication performed by a terminal device by using any of multiple transmission beams formed by a base station, comprising: the base station acquiring correction information used for correcting a measurement value for evaluating reception status of each transmission beam and transmitting the correction information to the terminal device so as to thereby promote the terminal device to use, or inhibit the terminal device from using a specific transmission beam; and upon receiving the correction information transmitted from the base station device, the terminal device correcting a measurement value for evaluating reception status of each transmission beam, and after selection of a transmission beam based on the corrected measurement value, the terminal device performing wireless communication with the base station device using the selected transmission beam.

This configuration makes it possible to prospectively avoid communication failures and/or reduction in throughput of each terminal device, thereby improving users' satisfaction with communication service in the same manner as the first aspect of the present invention.

Embodiments of the present invention will be described below with reference to the drawings.

First Embodiment

FIG. 1 is a diagram showing a general configuration of a communication system according to a first embodiment of the present invention.

The communication system includes user terminals 1 (communication devices), cellular communication base stations 2, a wireless LAN base station 3 (access point, base station device), and a communication control device 4.

A user terminal 1 may be a smartphone, a tablet terminal, and any other suitable terminal device. A user terminal 1 is capable of being connected to a cellular communication base station 2. A user terminal 1 can connect to the wireless LAN base station 3, and communicate with a counterpart station (such as a server) on the Internet via the wireless LAN base station 3.

A cellular communication base station 2 performs wireless communication using a high SHF band or EHF band (millimeter wave band), which can comply with 5G NR (New Radio). Transmission beam forming is done at a cellular communication base station 2 such that multiple transmission beams are formed, and the cellular communication base station 2 transmits a user terminal 1 via any one of the multiple transmission beams.

The wireless LAN base station 3 performs wireless communication using a communication scheme which utilizes a high SHF band or higher frequency bands such as WiGig (Registered Trademark). Transmission beam forming is done at the wireless LAN base station 3 such that multiple transmission beams are formed, and the wireless LAN base station 3 transmits a user terminal 1 via any one of the multiple transmission beams in the same manner as the cellular communication base station 2.

When a cellular communication base station 2 or the wireless LAN base station 3 transmits a measurement request signal and performs transmission beam forming, the transmission directions of respective transmission beams are fixed.

A user terminal 1 measures a measurement value for evaluating reception status, i.e. a received power of each transmission beam formed by a cellular communication base station 2 or the wireless LAN base station 3, and after selection of a transmission beam base on the measured received powers of the respective transmission beams, the user terminal 1 performs wireless communication with the cellular communication base station 2 or the wireless LAN base station 3.

The communication control device 4 may be configured to control communication using a cellular communication base station 2 such as a device for providing SMF (Session Management Function) or UPF (User Plane Function).

Figure 2:
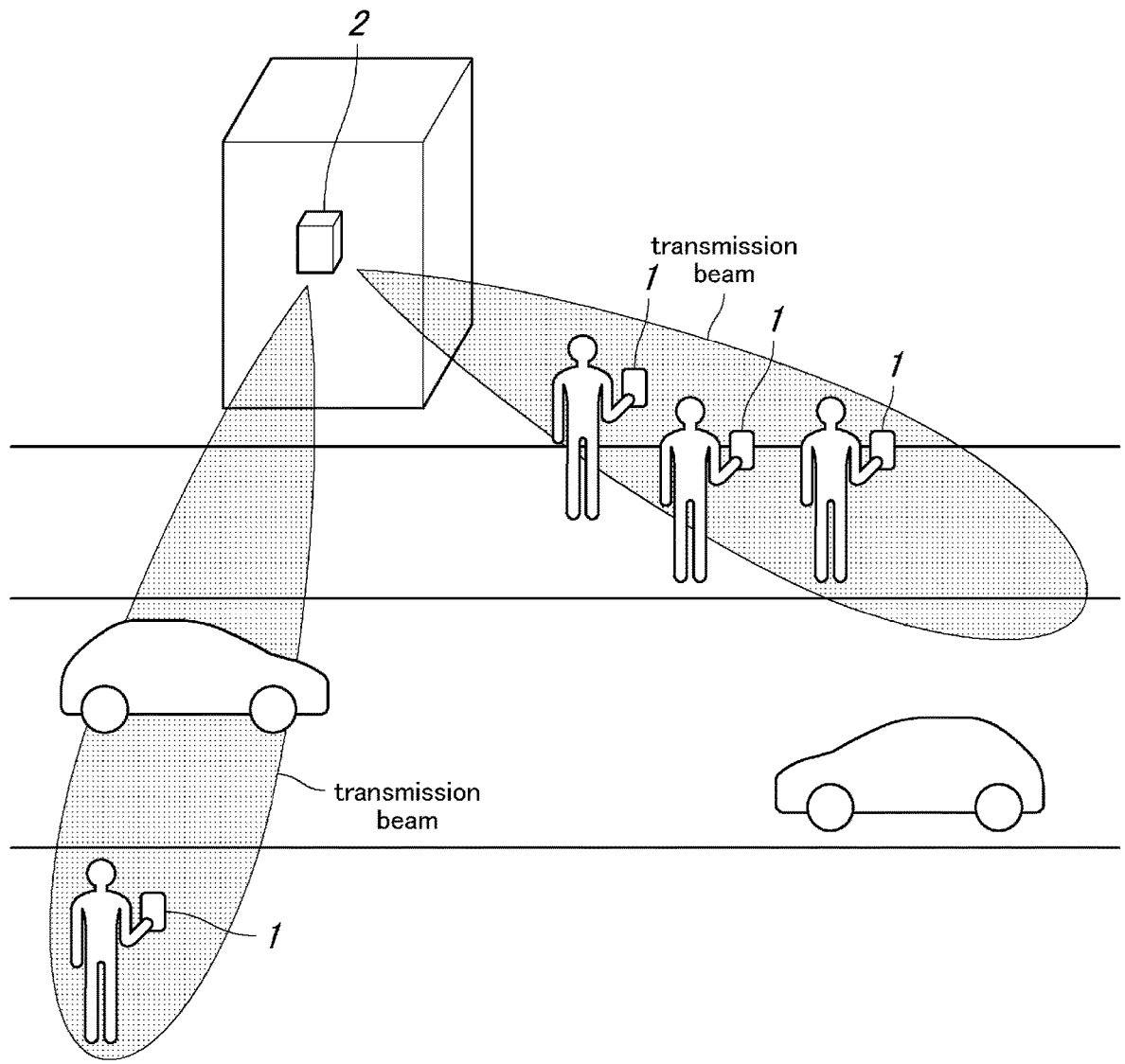
FIG. 2 is an explanatory view showing a situation where there are user terminals 1 and transmission beams of a base station 2 according to the first embodiment of the present invention.

Next, an outline of processing operations performed by a user terminal 1 and a cellular communication base station 2 according to the first embodiment of the present invention. FIG. 2 is an explanatory view showing a situation where there are user terminals 1 and transmission beams of a base station 2.

When an obstacle is located on a communication path between a user terminal and a base station 2, a decrease in communication quality occurs, thereby causing communication failures such as communication link disconnection. For example, when a transmission beam of a base station 2 is formed so as to cross a vehicular road with a large traffic volume of vehicles, communication failures are likely to occur. Also, when a transmission beam of the base station 2 is formed in a direction where there are many obstacles such as signboards and street trees, communication failures are likely to occur. Since the likelihood of occurrence of such a communication failure by such obstruction depends on the situation of obstacles, the likelihood does not greatly vary with time.

In this view, in the present invention, an offset value (initial offset value), which is a constant value, is determined such that a user terminal 1 is inhibited from using any transmission beam which is constantly in a bad communication environment, and the user terminal 1 corrects a measurement value of received power of the transmission beam based on the offset value.

As such, since a decrease in evaluation of a transmission beam which is constantly in a bad communication environment at a user terminal 1 results in that the user terminal 1 is inhibited from using the transmission beam, it becomes possible to n prospectively avoid communication failures.

Moreover, when a lot of user terminals concurrently use one transmission beam; that is, the transmission beam is in congestion status, the throughput of each user terminal is reduced. The likelihood of occurrence of reduction in throughput at each user terminal varies depending on a degree of congestion of the transmission beam.

In this view, in the present embodiment, a base station is configured to determine current congestion status of each transmission beam, and set an offset value so as to inhibit user terminals 1 from using any transmission beam in congestion status, and correct a measurement value of received power of the transmission beam based on the offset value. More specifically, in the present embodiment, an offset value different from an initial offset value is prepared for congestion status, and when a transmission beam is determined to be in congestion status, an offset value to be used is updated to the offset value for congestion status.

As a result, a user terminal is inhibited from using any transmission beam for which reduction in throughput due to traffic congestion is likely to occur. Thus, when a user terminal 1 newly connects to a base station 2, the user terminal 1 can select a transmission beam so as not to use any transmission beam in congestion status, and when a user terminal 1 is currently connecting to the base station 2, the user terminal 1 is controlled so as not to connect to any transmission beam in congestion status when changing its transmission beam to be used. Accordingly, it becomes possible to prospectively avoid reduction in the throughput at the user terminal.

For any transmission beam in congestion status, an offset value may be updated to a constant offset value for transmission beams in congestion status (congestion offset value). However, a congestion offset value for such a congested transmission beam may be changed according to a degree of congestion.

In the present embodiment, when a measurement value of received power of a transmission beam at a user terminal 1 is equal to or less than a predetermined reference power (a reference of received power detected in a transmission beam, for example, −120 dBm), the transmission beam is not regarded as an available transmission beam. Thus, when a measurement value of received power is corrected to be close to the predetermined reference power, a transmission beam for the measurement value is less likely to be selected. In some embodiment, when a user terminal 1 newly connects to a base station 2, a measurement value for a transmission beam, which is not to be selected, may be corrected to less than the predetermined reference power so that the transmission beam cannot be selected. When a user terminal 1 is currently connecting to the base station 2, a measurement value for a currently-connected transmission beam is preferably corrected so as not to be equal to or lower than the predetermined reference power because such a correction to a measurement value can result in disconnection of the user terminal from the currently-connected transmission beam. Thus, the preferable control of correction made to a measurement value enables such a currently-connected user terminal 1 to start to use a new transmission beam when necessary without disconnecting from the currently-connected transmission beam until the change of transmission beam to be used.

Figure 3:
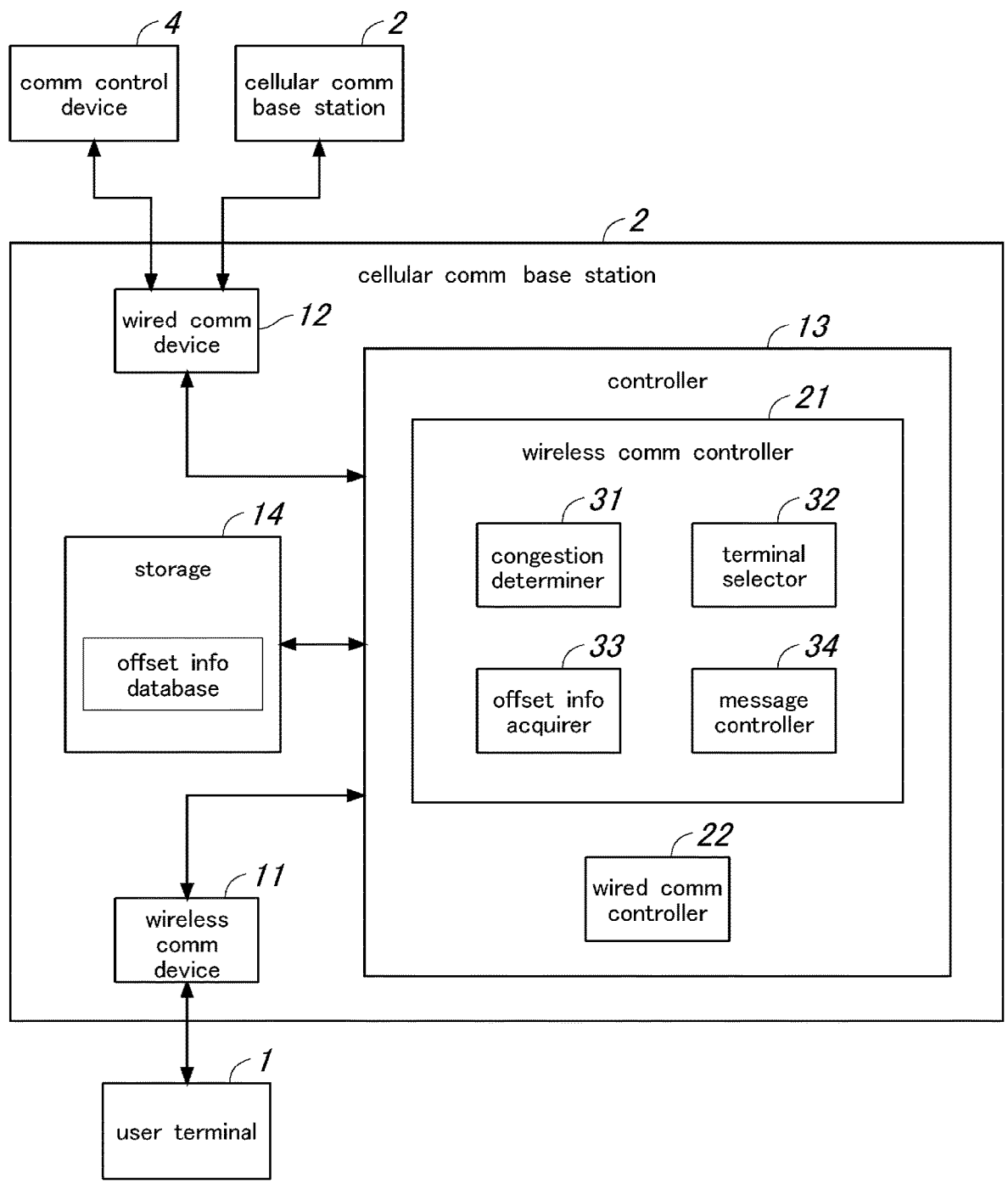
FIG. 3 is a block diagram showing a general configuration of a base station 2 according to the first embodiment of the present invention.

Next, a general configuration of a cellular communication base station 2 according to the first embodiment of the present invention will be described. FIG. 3 is a block diagram showing a general configuration of a cellular communication base station 2.

The cellular communication base station 2 includes a wireless communication device 11, a wired communication device 12, a controller 13, and a storage 14.

The wireless communication device 11 performs wireless communication with user terminals 1.

The wired communication device 12 performs wired communication with the communication control device 4 and/or one or more nearby base stations 2.

The storage 14 stores information on user terminals 1, information on nearby base stations 2, and programs executable by a processor which implements the controller 13. The storage also stores information registered in an offset information database. Information registered in the offset information database includes offset values for correcting measurement values, i.e. values of received power of respective transmission beams measured by user terminals 1. The offset values are comprised of initial offset values and congestion offset values for transmission beams in congestion status.

The controller 13 includes a wireless communication controller 21 and a wired communication controller 22. The controller 13 is implemented by the processor, and each part of the controller 13 is implemented by the processor executing a corresponding program stored in the storage 14.

The wired communication controller 22 is configured to exchange information on connection destinations of each user terminal 1 or some other information through wired communication with the communication control device 4, and/or the nearby base stations 2.

The wireless communication controller 21 includes a congestion determiner 31, a terminal selector 32, an offset information acquirer 33, and a message controller 34.

The congestion determiner 31 is configured to determine whether or not each transmission beam is in congestion status. In the present embodiment, the congestion determiner 31 determines whether or not each transmission beam is in congestion status based on the number of currently-communicating user terminals 1 for the transmission beam, i.e., the user terminals 1 currently performing communication by using the transmission beam. More specifically, the congestion determiner 31 determines whether or not the number of currently-communicating user terminals for a target transmission beam is equal to or greater than a predetermined threshold, and if the number of currently-communicating user terminals for the target transmission beam is equal to or greater than the threshold, the congestion determiner 31 determines that the target transmission beam is in congestion status.

The threshold for the number of currently-communicating user terminals for a target transmission beam is the upper limit of the number of user terminals 1 which are allowed for the use of the target transmission beam at one time. By using the threshold to restrict the number of currently-communicating user terminals 1 for a transmission beam, each user terminal 1 is allowed to maintain its high throughput.

The terminal selector 32 is configured to select a user terminal 1 to which offset information is transmitted among the currently-communicating user terminals. In the present embodiment, the terminal selector 32 selects, among the currently-communicating user terminals 1 which are using transmission beams in congestion status, a user terminal 1 capable of using a different transmission beam which is not in congestion status. If the terminal selector 32 finds two or more user terminals 1 capable of using one or more different transmission beams which are not in congestion status, the terminal selector 32 selects a user terminal 1 which is performing communication with a lowest communication quality level among the found user terminals.

The offset information acquirer 33 is configured to acquire offset information (correction information) which defines offset values for respective transmission beams. In the present embodiment, an offset value for each transmission beam is set based on congestion status thereof. Specifically, for a congested transmission beam, an offset value for correcting measurement values of received power is set so as to inhibit user terminals from using the congested transmission beam, and for a non-congested transmission beam, an initial offset value stored in the storage 14 is continued to be used.

When one or more user terminal 1 newly connect to a base station 2, the message controller 34 generates a broadcast information message for providing information including offset information acquired by the offset information acquirer 33, and transmits the broadcast information message to all the user terminals 1 located within a coverage area of the base station. The broadcast information message is transmitted to user terminals 1 which hare not performing communication with the base station, and thus the same information is transmitted to all such user terminals 1. When a user terminal 1 is currently connecting to the base station 2, the message controller 34 generates a measurement-related information message including offset information, and transmits the measurement-related information message to the currently-connected user terminal 1. The measurement-related information message is transmitted to one or more currently-communicating user terminals 1, whereby a corresponding piece of information is transmitted to each corresponding currently-communicating user terminal 1.

In FIG. 3, the general configuration of the cellular communication base station 2 is shown. However, the wireless LAN access point 3 has substantially the same general configuration as the cellular communication base station.

Figure 4:
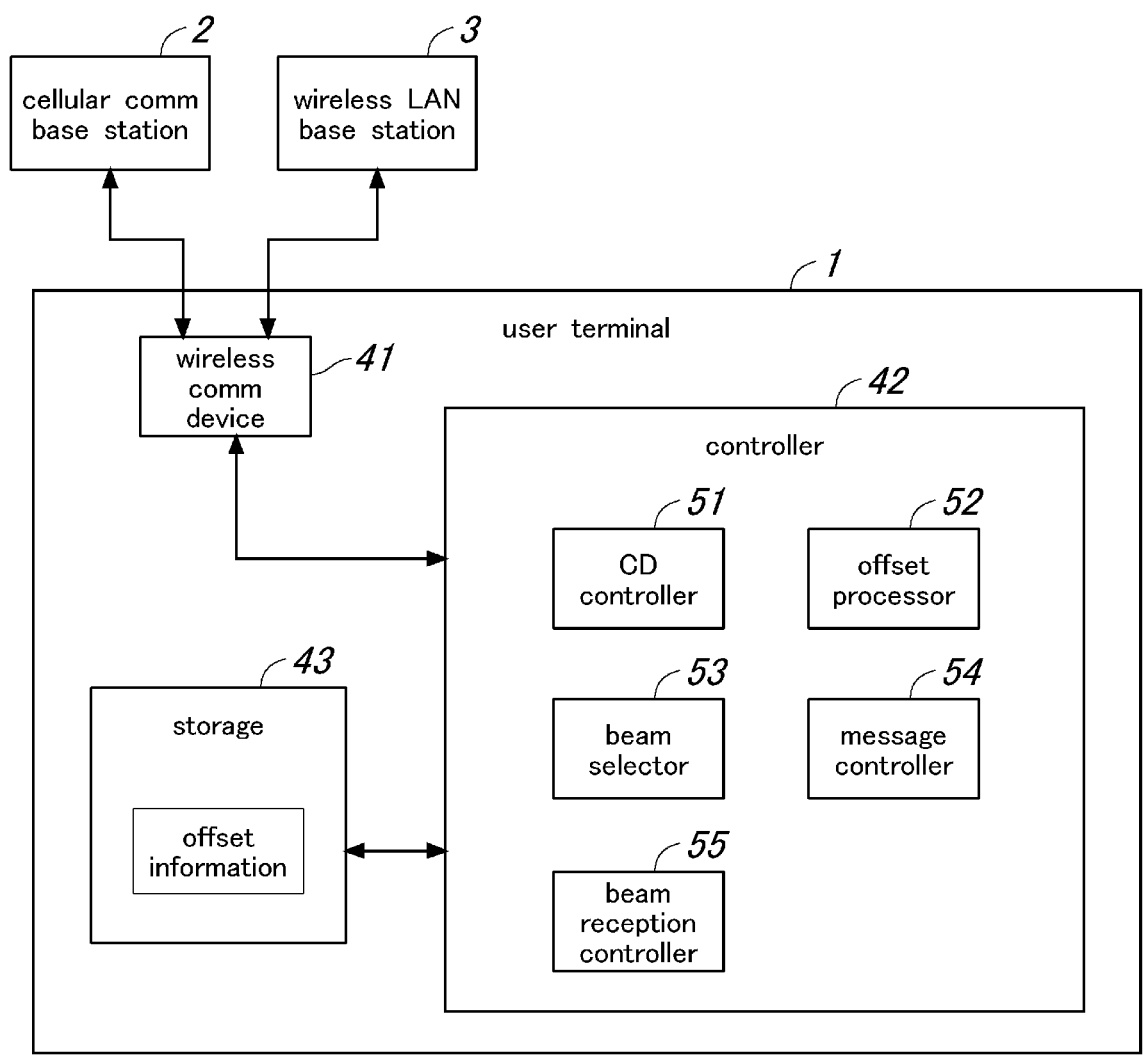
FIG. 4 is a block diagram showing a general configuration of a user terminal 1 according to the first embodiment of the present invention.

Next, a general configuration of a user terminal 1 according to the first embodiment of the present invention will be described. FIG. 4 is a block diagram showing a general configuration of a user terminal 1.

The user terminal 1 includes a wireless communication device 41, a controller 42, and a storage 43.

The wireless communication device 41 performs communication with the cellular communication base station 2 and the wireless LAN base station 3 and transmits and receives data to and from a counterpart station (such as a server) on the Internet.

The storage 34 stores information on the user terminal itself, information on base stations 2, 3 and programs executable by a processor, which implement the controller 42. The storage 34 also stores offset information included in messages received from the base station 2.

The controller 42 includes a connection destination controller 51, an offset processor 52, a beam selector 53, a message controller 54, and a beam reception controller 55. The controller 42 is implemented by the processor, and each part of the controller 42 is implemented by the processor executing a corresponding program stored in the storage 43.

The connection destination controller 51 performs a cell search operation for searching for a connectable cell. In addition, the connection destination controller 51 performs a proper cell determination operation to determine whether or not a cell selected by the beam selector 53 meets criteria for a proper cell on which the user terminal 1 can camp. Also, the connection destination controller 51 performs a camp-on processing operation to shift to a camp state where the user terminal monitors information on a system of a cell which is determined to be a proper cell.

The offset processor 52 acquires offset information included in messages received from the base station 2, acquires an offset value for each transmission beam based on the offset information, and corrects a measurement value of received power of each transmission beam based on the acquired offset value to obtain a corrected measurement value of received power.

The offset processor 52 corrects a measurement value of received power of a transmission beam by subtracting an offset value from an measurement value of received power or adding an offset value to an measurement value of received power. Thus, by subtracting an offset value from a measurement value of received power of a transmission beam at the user terminal, the base station can correct a measurement value of received power at the user terminal to be lower than the actual measurement value, thereby decreasing an evaluation of the transmission beam so as to inhibit the user terminal 1 from using the transmission beam. Also, by adding an offset value to a measurement value of received power of a transmission beam at the user terminal, the base station can correct a measurement value of received power at the user terminal to be higher than the actual measurement value, thereby increasing an evaluation of the transmission beam so as to promote the user terminal 1 to use the transmission beam.

The beam selector 53 selects a proper transmission beam based on a corrected measurement value of received power acquired by the offset processor 52 when the user terminal 1 newly connects the base station. When the user terminal 1 is currently connecting to the base station 2, the base station 2 selects an optimal transmission beam.

When the user terminal 1 is currently connecting to the base station 2, the message controller 54 determines whether or not the user terminal needs to report a measurement value of received power based on the corrected measurement value of received power obtained by the offset processor 52 (Report event determination). If reporting is necessary, the message controller 54 generates a beam measurement report message including a corrected measurement value of received power, and transmits the beam measurement report message to the base station 2.

When the user terminal 1 newly connects to the base station 2, the beam reception controller 55 controls transmission beam reception so that the user terminal starts communication using a transmission beam selected by the beam selector 53. Also, when the user terminal 1 is currently connecting to the base station 2, upon receiving a beam designation message transmitted from the base station 2, the beam reception controller 55 changes the transmission beam to a transmission beam designated by the message.

Next, offset information on each offset value to be added to a broadcast information message and a measurement-related information message according to the first embodiment of the present invention will be described. FIG. 5 is an explanatory view showing offset information on each offset value to be added to a broadcast information message. FIG. 6 is an explanatory view showing offset information on each offset value to be added to a measurement-related information message.

In the present embodiment, offset information (correction information) including an offset value for each transmission beam is added to a broadcast information message (a message for transmitting the same information to all the user terminals 1 located within a coverage area of a base station) and a measurement-related information message (a message for transmitting respective pieces of information to the different currently-communicating user terminals 1), and then transmitted to the user terminals. Since a base station 2 forms a lot of transmission beams, for example, 100 to 200 transmission beams, if an offset value included in offset information is individually defined for each transmission beam, the amount of transmitted data becomes too large. Therefore, offset information to be added to messages is determined as described below. It should be noted that examples for broadcast information messages shown in FIG. 5 assumes that only 10 transmission beams are formed for the purpose of illustration.

In a first method as shown in FIG. 5A-1, multiple transmission beams placed in order of beam ID and equally grouped; that is, grouped into some beam groups such that each beam group includes an equal number of transmission beams, an offset value is defined for each beam group. Then, as shown in FIG. 5A-2, offset information to be added to messages includes the number of beams per group and an offset value for each beam group ID.

In this case, the user terminal 1 can, based on the number of transmission beams per group, specify which beam group each transmission beam belongs to. Then, for each transmission beam, the user terminal can specify a corresponding offset value based on respective offset values for beam group IDs.

In this first method, the number of beams per group can be changed. However, a same offset value is used for all the transmission beams belonging to each beam group.

In a second method as shown in FIG. 5B-1, multiple transmission beams placed in order of beam ID and grouped into beam groups such that each beam group includes transmission beams having consecutive beam IDs for which a same offset value is to be used. Then, as shown in FIG. 5(B-2), offset information to be added to messages includes the beam ID (identifier) of the first transmission beam (beginning beam) of each beam group, the number of transmission beams included in the beam group (the number of transmission beams with consecutive beam IDs), and a corresponding offset value for the beam group.

In this second method, since determination of offset values is not restricted by the definition of beam groups as the first method shown in FIG. 5A, a degree of freedom in determination of offset values is higher than in the first method.

In the examples for a measurement-related information message shown in FIG. 6, offset information to be added to a message includes each beam ID and an offset value acquired for a user terminal 1 to which measurement-related information message is to be transmitted.

Next, offset information on offset values stored in each user terminal 1 according to the first embodiment of the present invention will be described. FIG. 7 is an explanatory view showing offset information on offset values stored in each user terminal 1.

In the present embodiment, when a user terminal 1 receives a broadcast information message and a measurement-related information message from a base station 2 serving a cell in which the user terminal is present, the storage 43 of the user terminal stores offset information included in the messages. As the user terminal 1 moves, a cell in which the user terminal is present can change from one cell to another. As a result, the user terminal 1 can acquire, for each cell, corresponding offset information from a base station 2 serving the cell, and thus the user terminal 1 stores offset information accumulated in the storage 34 for each of the cells on a moving route along which the user terminal 1 traveled in the past. When a new offset value is provided from a base station, the user terminal can update the offset information stored in the storage 34 so that newest offset information is stored in the storage 34.

When temporally losing a transmission beam currently used for communication, the user terminal 1 becomes unable to receive measurement-related information messages, and thus unable to acquires offset information from a base station 2. In this case, the user terminal 1 acquires offset information for the cell in which the user terminal is present from all offset information for respective cells stored in the storage 43, and corrects a measurement value of received power using the acquired offset information.

Moreover, in the present embodiment, the base station 2 transmits, in addition to offset information, information on a data retention period for the offset information to the user terminal 1. The user terminal 1 deletes offset information stored in the storage 43 after a lapse of a data retention period therefor.

Although FIG. 7 shows an example of offset information generated by the first method as shown in FIG. 5A, the discussion about this example of offset information can similarly apply to offset information generated by the second method as shown in FIG. 5B.

Next, an operation procedure of operations performed by a base station 2 when a user terminal 1 newly connects to the base station 2 according to the first embodiment of the present invention will be described. FIG. 8 is a flowchart showing an operation procedure of operations performed by a base station 2 when a user terminal 1 newly connects to the base station 2.

As shown in FIG. 8A, first, the offset information acquirer 33 in the base station 2 acquires an initial offset value for each transmission beam from the storage 14 (ST101). Next, the congestion determiner 31 determines the congestion status of each transmission beam (ST102). If there is a transmission beam in congestion status (Yes in ST103), the offset information acquirer 33 corrects an offset value for the transmission beam to a different offset value for congestion status; that is, updates the offset value for the transmission beam to a congestion offset value used to correct a measurement value of received power in the congested transmission beam so as to inhibit user terminals from using the congested transmission beam (ST104).

Next, the message controller 34 generates a broadcast information message including one or more updated offset values for congested transmission beams and one or more initial offset values for non-congested transmission beams (ST105). Then, the message controller broadcasts the broadcast information message to user terminals 1 located in the coverage area of the base station 2 (ST106).

When there is no transmission beam in congestion status (No in ST103), the message controller 34 generates a broadcast information message including initial offset values for the respective transmission beams without updating any offset value (ST104). Then, the message controller broadcasts the broadcast information message to user terminals 1 located in the coverage area of the base station 2 (ST106).

As shown in FIG. 8B, when determining the congestion status of each transmission beam (ST102), the congestion determiner 31 acquires the number of currently-communicating user terminals of each transmission beam; that is, the number of user terminals 1 communicating with the base station by using each transmission beam (ST201). Then, congestion determiner 31 determines whether or not the number of currently-communicating terminals of a target transmission beam is equal to or greater than a predetermined threshold (ST202). If the number of currently-communicating user terminals is equal to or larger than the threshold value (Yes in ST202), the congestion determiner 31 determines that the target transmission beam is in congestion status (ST203). The processing operations of ST202 and ST203 are repeated in order until the processing operations are completed for all the transmission beams (Yes in ST204).

Figure 9:
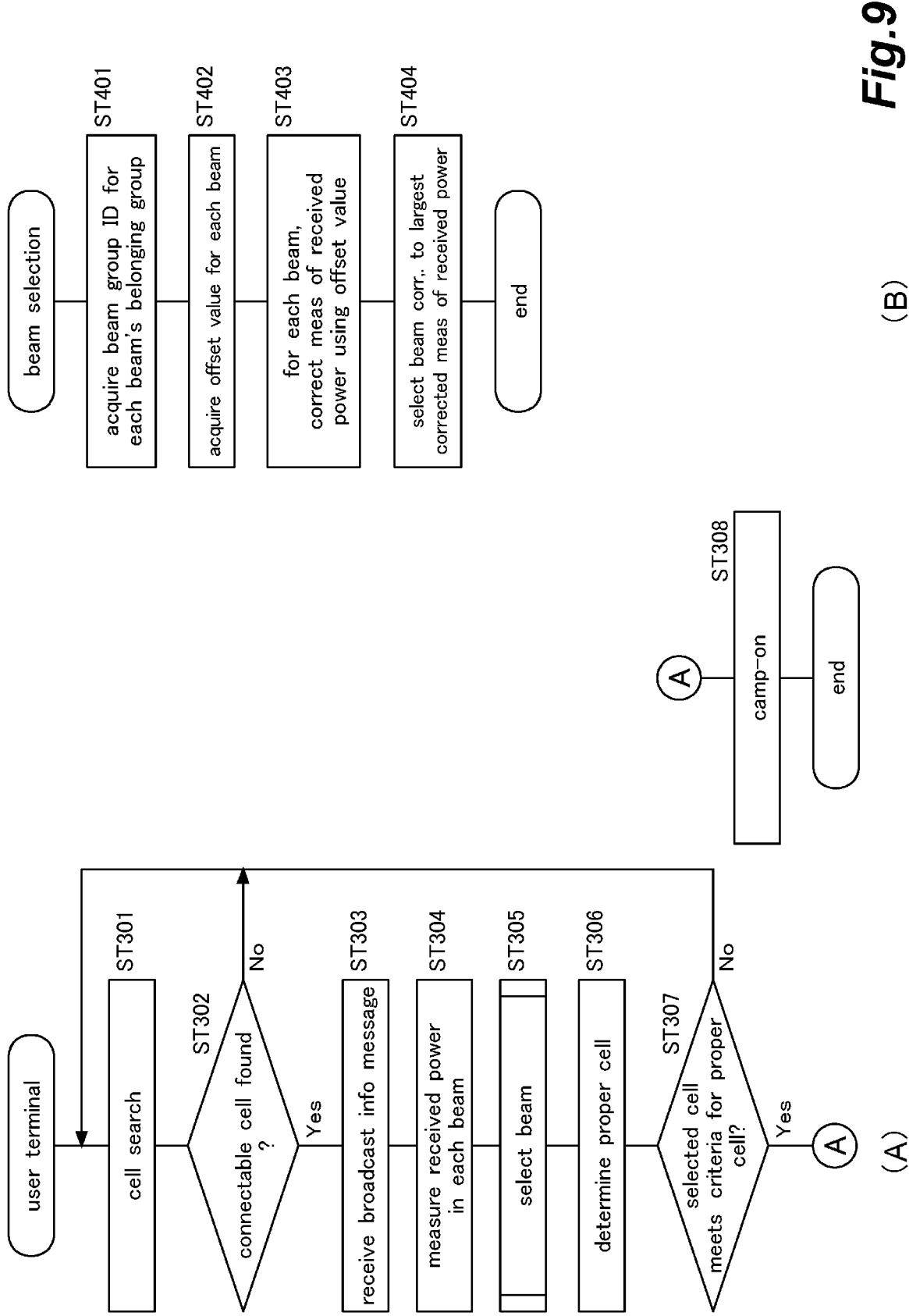
FIG. 9 is a flowchart showing an operation procedure of operations performed by a user terminal 1 when the user terminal newly connects to the base station 2 according to the first embodiment of the present invention.

Next, an operation procedure of operations performed by a user terminal 1 when the user terminal newly connects to the base station according to the first embodiment of the present invention will be described. FIG. 9 is a flowchart showing an operation procedure of operations performed by a user terminal 1 when the user terminal newly connects to the base station 2.

As shown in FIG. 9A, in the user terminal 1, first, the connection destination controller 51 performs the cell search operation for searching for a connectable cell (ST301). Then, when the connection destination controller 51 finds a connectable cell (Yes in ST302), the wireless communication device 41 receives a broadcast information message transmitted from the base station 2 corresponding to each detected connectable cell (ST303).

Next, the wireless communication device 41 measures the received power of each transmission beam (ST 304). Next, the beam selector 53 performs a beam selection operation for selecting a proper transmission beam (ST305). Next, the connection destination controller 51 performs the proper cell determination operation; that is, determines whether or not the selected cell meets the criteria for proper cell on which the user terminal 1 can camp (ST306).

If the selected cell meets the criteria for proper cell (Yes in ST307), the connection destination controller 51 determines that the selected cell to be a proper cell, and the connection destination controller 51 camps on the selected cell; that is, shifts to a camp state where the user terminal monitors information on a system of the selected cell (ST308).

If the selected cell does not meet the criteria for proper cell (No in ST307), the process returns to ST301.

As shown in FIG. 9B, when performing the beam selection operation (ST305), the offset processor 52 acquires a beam group ID to which each transmission beam belongs based on the offset information (see FIG. 5) included in the broadcast information message (ST401). Next, the offset processor 52 acquires an offset value for each transmission beam based on the offset value for each beam group ID (ST402).

Next, the offset processor 52 corrects a measurement value of received power of each transmission beam based on the offset value for each transmission beam (ST403). Specifically, for each transmission beam, the offset processor 52 subtracts or adds a corresponding offset value from or to a measurement value of received power. Next, the beam selector 53 selects a transmission beam in which the largest corrected measurement value of received power is obtained (ST404).

Figure 10:
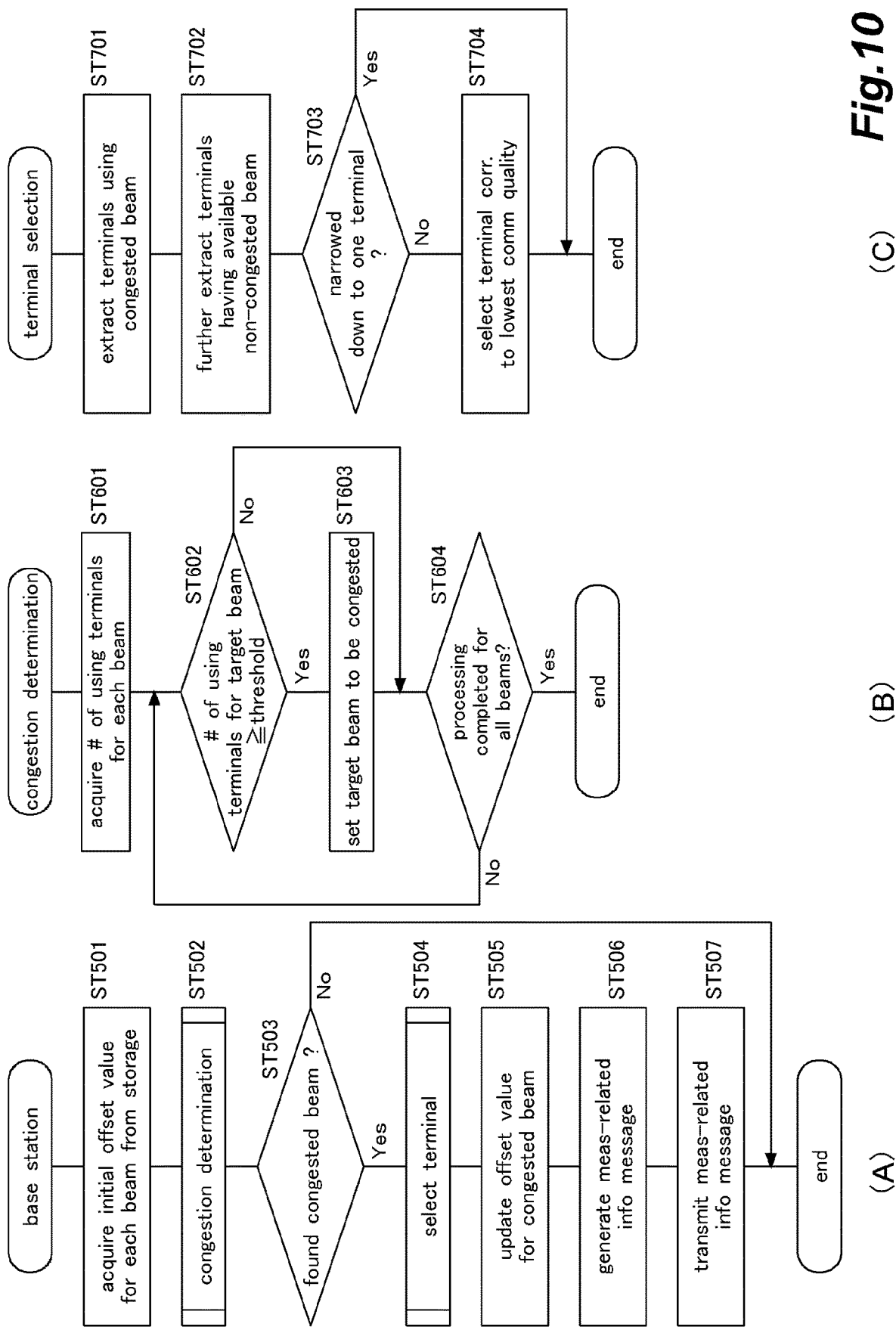
FIG. 10 is a flowchart showing an operation procedure of operations performed by the base station 2 when a user terminal 1 is currently connecting to the base station 2 according to the first embodiment of the present invention.

Next, an operation procedure of operations performed by the base station 2 when a user terminal 1 is currently connecting to the base station 2 according to the first embodiment of the present invention will be described. FIG. 10 is a flowchart showing an operation procedure of operations performed by the base station 2 when a user terminal 1 is currently connecting to the base station 2.

As shown in FIG. 10A, in the base station 2, first, the offset information acquirer 33 acquires an initial offset value for each transmission beam from the storage 14 (ST501). Next, the congestion determiner 31 performs a congestion determination operation; that is, determines whether or not each transmission beam is in congestion status (ST502).

When there is at least one congested transmission beam (Yes in ST503), the terminal selector 32 performs a terminal selection operation for selecting, among the user terminals 1 using congested transmission beams, one or more user terminals 1 which can change their transmission beams to other transmission beams which are not in congestion status (ST504).

Next, the offset information acquirer 33 updates one or more offset values among the offset values for transmission beams used by the user terminals 1 selected by the terminal selector 32. Specifically the offset information acquirer 33 updates offset values for congested transmission beams to congestion offset values, where the congestion offset values are offset values used to correct measurement values of received power in the transmission beams so as to inhibit the user terminals 1 from using the transmission beams in congestion status (ST505).

Next, the message controller 34 generates a measurement-related information message including the updated congestion offset values for the congested transmission beams and the initial offset values for the non-congested transmission beams (ST506). Then, the wireless communication device 11 transmits the measurement-related information message to the selected user terminals 1 (ST507).

When there is no transmission beam in congestion status (Yes in ST503), the controller 13 ends the operation without any further processing.

In the above-described embodiment, the controller is configured to set offset values for congested transmission beams so as to inhibit user terminals 1 from using the congested transmission beams. However, the controller may be configured to set offset values for congested transmission beams so as to promote user terminals 1 to use different transmission beams which are not in congestion status.

As shown in FIG. 10B, in the congestion determination operation (ST502), the congestion determiner 31 determines the number of currently-communicating terminals for each transmission beam; that is, the number of currently-communicating user terminals 1 using each transmission beam (ST601). Then, the congestion determiner 31 determines whether or not the number of currently-communicating terminals for a target transmission beam is equal to or greater than a predetermined threshold Th (ST602). If the number of currently-communicating terminals is equal to or greater than the predetermined threshold value (Yes in ST602), the congestion determiner 31 determines that the target transmission beam is in congestion status, or "congested" (ST603). The processing operations of ST602 and ST603 are repeated in order until the processing operations are completed for all the transmission beams (Yes in ST604).

As shown in FIG. 10C, in the terminal selection operations (ST504), the terminal selector 32 extracts multiple currently-communicating user terminals 1 using congested transmission beams (ST701). Next, the terminal selector 32 extracts one or more user terminals 1 capable of using other transmission beams which are not in congestion status (ST702). If two or more such user terminals are extracted (No in ST703), the terminal selector 32 selects a user terminal 1 which is performing communication with a lowest communication quality level among the extracted user terminals (ST704). As a result, frequency usage efficiency is improved. When fair availability to different user terminals 1 is important, the selection operations (ST703 to ST704) to narrow the user terminals down to one user terminal may be omitted.

If the selection operations narrows the extracted user terminals down to one user terminal 1 (Yes in ST703), the process ends at that point.

Figure 11:
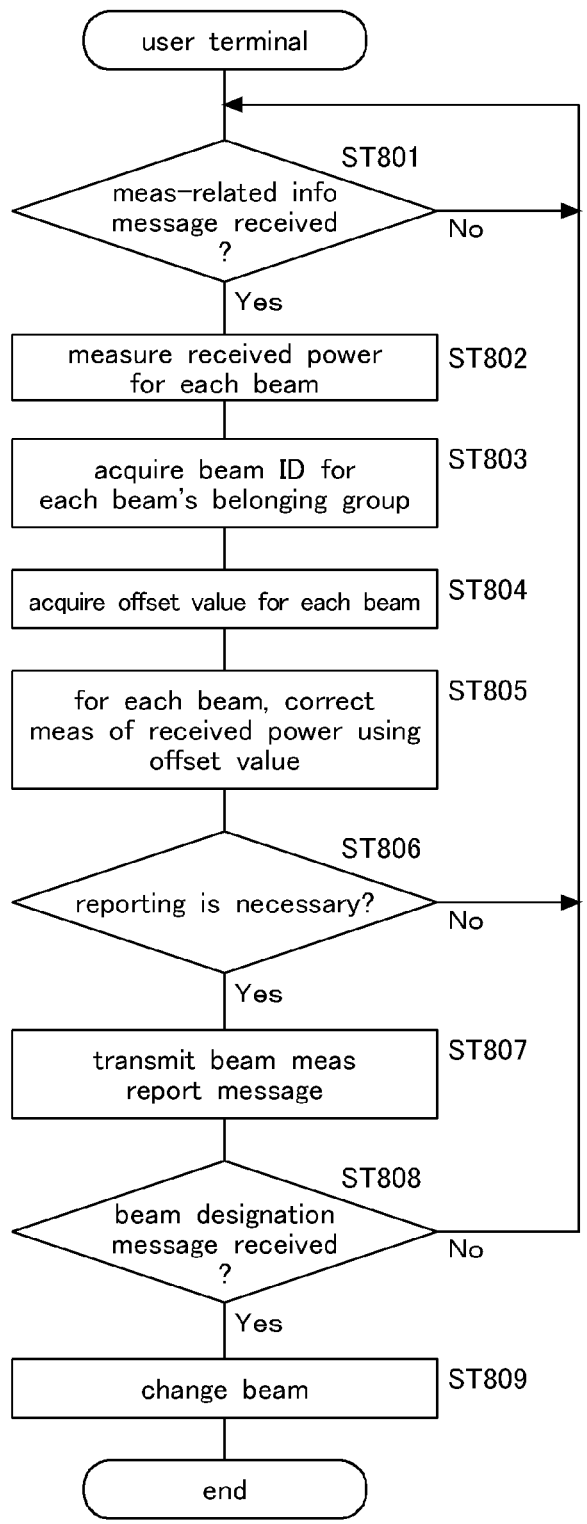
FIG. 11 is a flowchart showing an operation procedure of operations performed by a user terminal 1 when the user terminal 1 is currently connecting to the base station 2 according to the first embodiment of the present invention.

Next, an operation procedure of operations performed by a user terminal 1 when the user terminal 1 is currently connecting to the base station 2 according to the first embodiment of the present invention will be described. FIG. 11 is a flowchart showing an operation procedure of operations performed by a user terminal 1 when the user terminal 1 is currently connecting to the base station 2.

In the user terminal 1, first, upon receiving a measurement-related information message transmitted from the base station 2 (Yes in ST801), the wireless communication device 41 measures the received power in each transmission beam (ST802).

Next, the offset processor 52 acquires a beam group ID to which each transmission beam belongs based on offset information included in the measurement-related information message (ST803). Then, the offset processor 52 acquires an offset value for each transmission beam from the offset information in the storage 43 (see FIG. 7) based on the offset values for respective beam group IDs (ST804). Nest, the offset processor 52 corrects a measurement value of received power in each transmission beam based on the offset values for respective transmission beams (ST805). Specifically, for each transmission beam, the offset processor 52 subtracts or adds a corresponding offset value from or to a measurement value of received power in each transmission beam to thereby correct the measurement value.

Next, the message controller 54 performs a report event determination operation to determine whether or not the user terminal needs to report a measurement value of received power based on the corrected measurement value of received power (ST806). If reporting is necessary, the wireless communication device 41 transmits to the base station 2 a beam measurement report message including the corrected measurement value of received power (ST807). When the wireless communication device 41 receives a beam designation message transmitted from the base station 2 (Yes in ST808), the beam reception controller 55 changes the transmission beam to be used to a transmission beam designated by the message (ST809).

If reporting is not necessary (No in ST806) or if the wireless communication device 41 does not receive a beam designation message (No in ST808), the process returns to ST801.

Although FIGS. 8 and 10 show the operation procedure of operations performed by the cellular communication base station 2, the discussion about the procedure can similarly apply to operations performed by the wireless LAN base station 3. Although FIGS. 9 and 11 show an exemplary case in which a connection destination of the user terminal 1 is the cellular communication base station 2, the discussion about this case can similarly apply to a case in which a connection destination of the user terminal 1 is the wireless LAN base station 3.

Second Embodiment

Next, a second embodiment of the present invention will be described. Except for what will be discussed here, this embodiment is the same as the above-described embodiment. Although an exemplary case in which a connection destination of a user terminal 1 is the cellular communication base station 2 will be described here, the discussion about this case similarly applies to a case in which a connection destination of a user terminal 1 is the wireless LAN base station 3.

Since a traffic volume of vehicles as obstacles changes with time of day, the frequency of occurrence of communication failures changes depending on time of day. Also, as a traffic volume of people with user terminals 1 changes with time of day, utilization of transmission beams changes depending on time of day.

In this view, in the present invention, the offset information acquirer 33 determines whether the current time is (i) the time of day in which a communication environment (such as a traffic volume of vehicles or a traffic volume of people) is deteriorated or (ii) the current time is the time of day in which a communication environment is good, and then the offset information acquirer 33 sets offset values according to result of the determination. More specifically, in the present invention, for each transmission beam, a middle-night offset value and a standard offset value are preset and stored in the storage 14, and the offset information acquirer 33 determines whether or not the current time is a middle-night time (for example, 0:00 to 5:00 AM), and acquires middle-night offset values or standard offset values in the storage 14 according to result of the determination.

Figure 12:
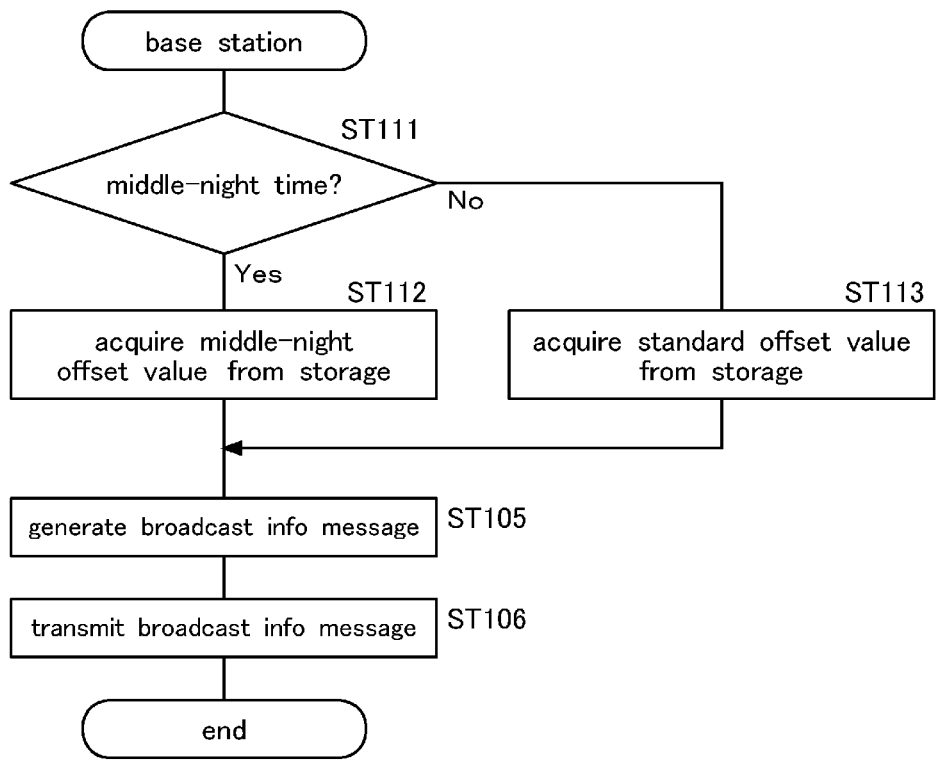
FIG. 12 is a flowchart showing an operation procedure of operations performed by a base station 2 when a user terminal 1 newly connects to the base station 2 according to a second embodiment of the present invention.

Next, an operation procedure of operations performed by a base station 2 when a user terminal 1 newly connects to the base station 2 according to the second embodiment of the present invention will be described. FIG. 12 is a flowchart showing an operation procedure of operations performed by a base station 2 when a user terminal 1 newly connects to the base station 2.

In the base station 2, first, the offset information acquirer 33 determines whether or not the current time is in a middle-night time (ST111). If the current time is the middle-night time (Yes in ST111), the offset information acquirer 33 acquires a middle-night offset value for each transmission beam from the storage 14 (ST112). Next, the message controller 34 generates a broadcast information message including the middle-night offset value for each transmission beam (ST105), and broadcasts the broadcast information message to the user terminals 1 located in a coverage area of the base station (ST106).

If the current time is not in the middle-night time (No in ST111), the offset information acquirer 33 acquires a standard offset value for each transmission beam from the storage 14 (ST112). Next, the message controller 34 generates a broadcast information message including the standard offset value for each transmission beam (ST105), and broadcasts the broadcast information message to the user terminals 1 located in a coverage area of the base station (ST106).

Third Embodiment

Figure 13:
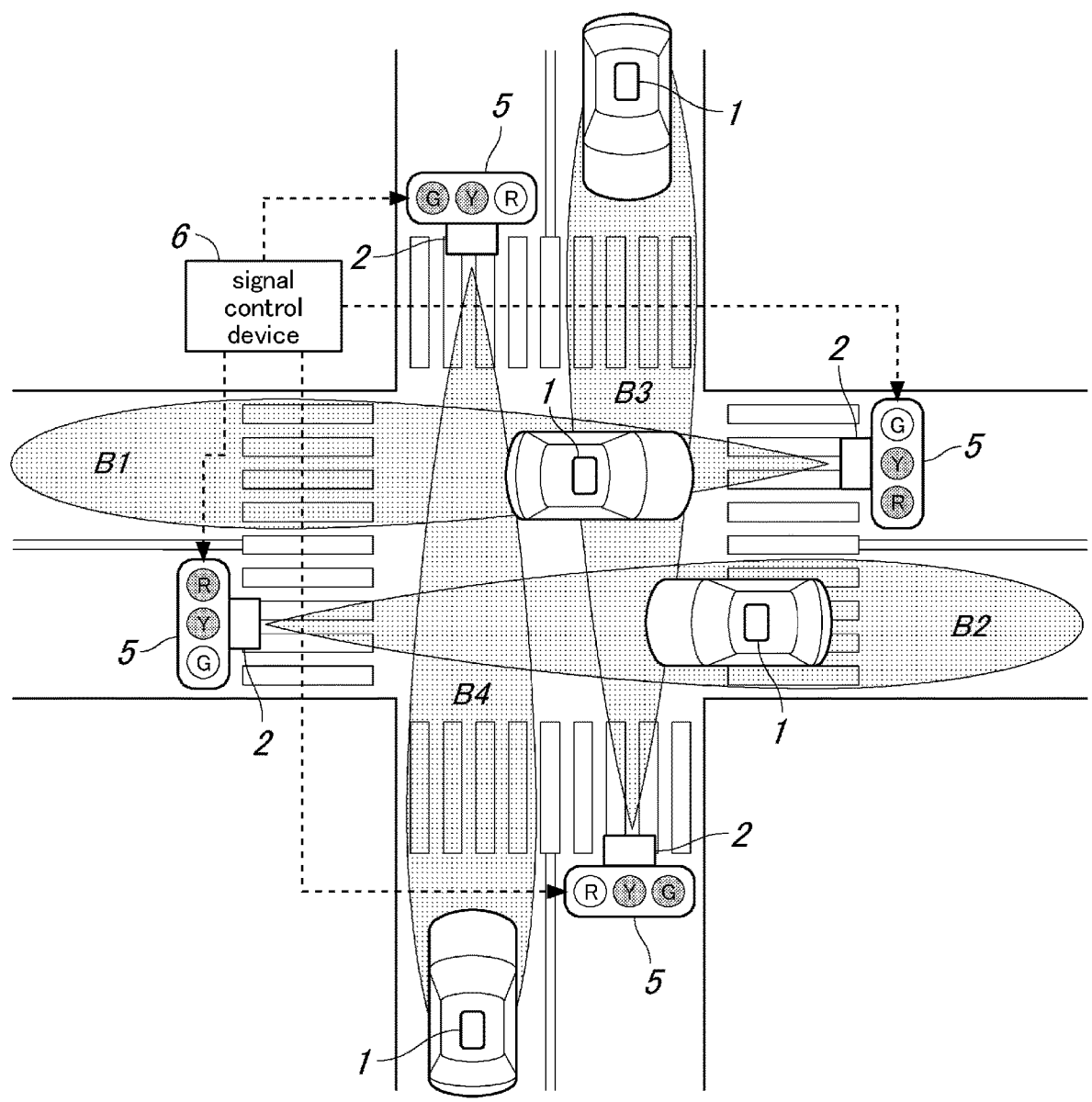
FIG. 13 is an explanatory view showing a situation where there are user terminals 1 and transmission beams formed by base stations 2 according to a third embodiment of the present invention.

Next, a third embodiment of the present invention will be described. Except for what will be discussed here, this embodiment is the same as the above-described embodiments. Although an exemplary case in which a connection destination of a user terminal 1 is the cellular communication base station 2 will be described here, the discussion about this case similarly applies to a case in which a connection destination of a user terminal 1 is the wireless LAN base station 3. FIG. 13 is an explanatory view showing a situation where there are user terminals 1 and transmission beams formed by base stations 2.

A transmission beam directed to a vehicular road is formed, an occupant of a vehicle can communicate with the base station 2 using a user terminal 1 owned by the occupant or a user terminal 1 mounted on the vehicle through the transmission beam. In this case, when the vehicle is traveling at an intersection under a green light of a traffic signal 5 (in the left-right direction in FIG. 13) and thus the user terminal 1 moves at a high speed at the intersection, a communication failure is likely to occur. When the vehicle stops under a red right (in the vertical direction in FIG. 13), a communication failure is unlikely to occur, which allows for stable wireless communication.

In this view, in the present invention, the offset information acquirer 33 sets offset values for each state of a traffic signal 5. More specifically, in the present invention, a base station 2 is configured to: acquire control information on control of traffic signals 5 from a signal control device 6; identify a traffic lane in which a green light permits traffic to travel and a traffic lane in which a red light inhibits traffic from traveling based on the acquired control information; and set an offset value for each transmission beam for a corresponding traffic lane according to traffic flow permission status of the traffic lane.

Specifically, for each of the transmission beams B1 and B2 formed for the traffic lane in which the green light permits traffic to travel, an offset value is set so as to inhibit user terminals 1 from using the transmission beam, whereas, for each of the transmission beams B3 and B4 formed for the traffic lane in which the red light inhibits traffic from traveling, a different offset value is set so as to promote user terminals 1 to use the transmission beam.

As a result, since a user terminal 1 mounted on a vehicle traveling under a green light is inhibited from using a transmission beam formed for the traffic lane in which the green light permits traffic to travel, it becomes possible to prospectively avoid occurrence of a communication failure due to high speed traveling. Also, since a user terminal 1 mounted on a vehicle stopping under a red light is promoted to use a transmission beam formed for the traffic lane in which the red light inhibits traffic from traveling, it becomes possible for the user terminal to perform communication with a base station 2.

Figure 14:
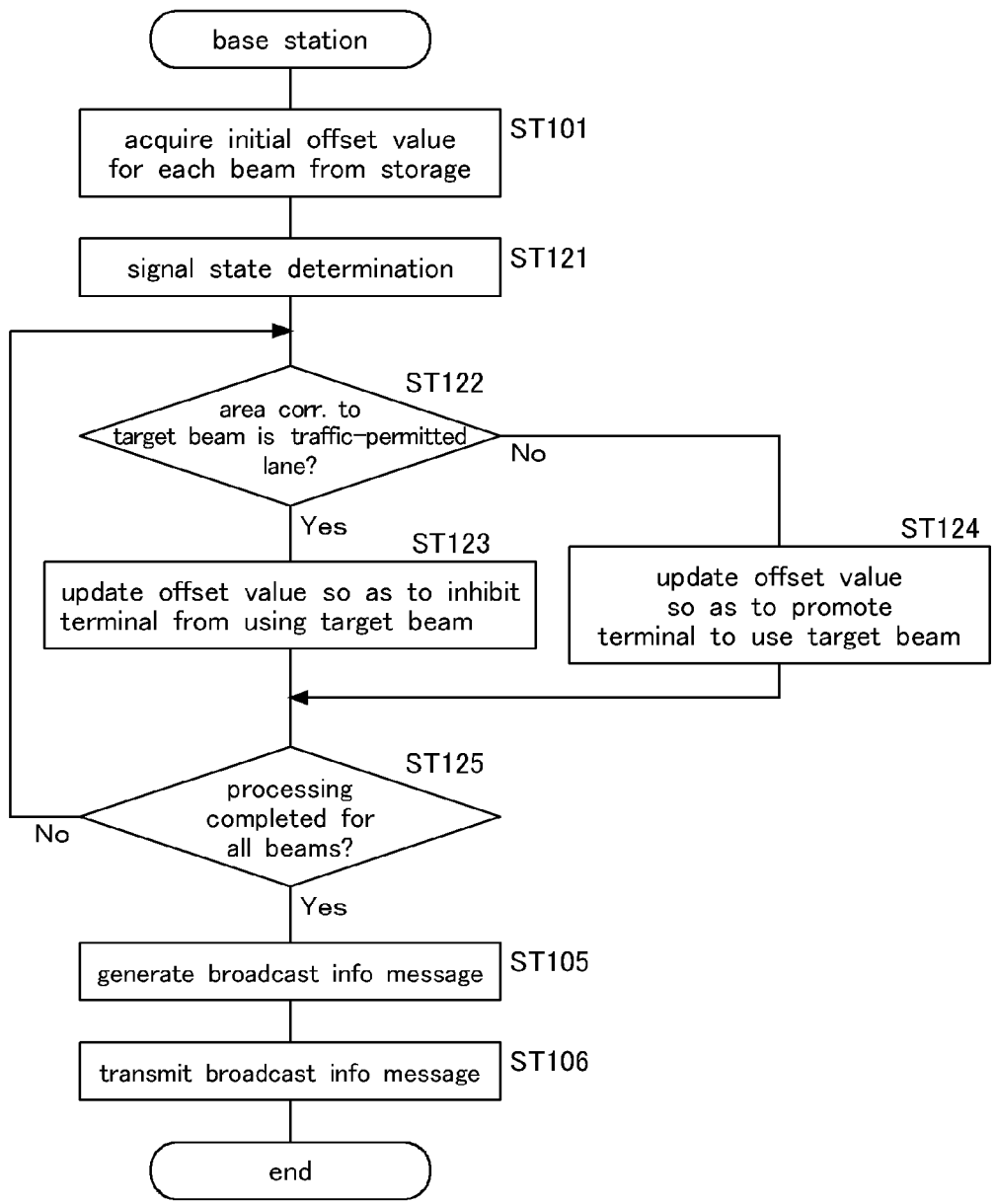
FIG. 14 is a flowchart showing an operation procedure of operations performed by a base station 2 when a user terminal 1 newly connects to the base station 2 according to the third embodiment of the present invention.

Next, an operation procedure of operations performed by a base station 2 when a user terminal 1 newly connects to the base station 2 according to the third embodiment of the present invention will be described. FIG. 14 is a flowchart showing an operation procedure of operations performed by a base station 2 when a user terminal 1 newly connects to the base station 2.

First, the offset information acquirer 33 in the base station 2 acquires an initial offset value for each transmission beam from the storage 14 (ST101). Next, the offset information acquirer 33 acquires control information on traffic signals 5 from the signal control device 6, and performs a signal state determination operation based on the acquired control information in order to determine in which traffic lane at the intersection, vehicular traffic is permitted to travel (ST121).

Next, the offset information acquirer 33 determines whether or not an area for which a target transmission beam is formed is a travel-permitted lane; that is, a lane in which vehicular traffic is permitted to travel (ST122). If the area for which the target transmission beam is formed is a travel-permitted lane (Yes in ST122), the offset information acquirer 33 updates the offset value used in a user terminal 1 to such an offset value as to inhibit the user terminal 1 from using the target transmission beam (ST123). If the area for which the target transmission beam is formed is not a travel-permitted lane (No in ST122), the offset information acquirer 33 updates the offset value used in the user terminal 1 to such an offset value as to promote the user terminal 1 to use the target transmission (ST124).

The processing operations of ST122 to ST124 are repeated in order until the processing operations are completed for all the transmission beams (Yes in ST204).

Next, the message controller 34 generates a broadcast information message including one or more updated offset values for respective transmission beams (ST105). Then, the message controller broadcasts the broadcast information message to user terminals 1 located in the coverage area of the base station 2 (ST106).

Fourth Embodiment

Figure 15:
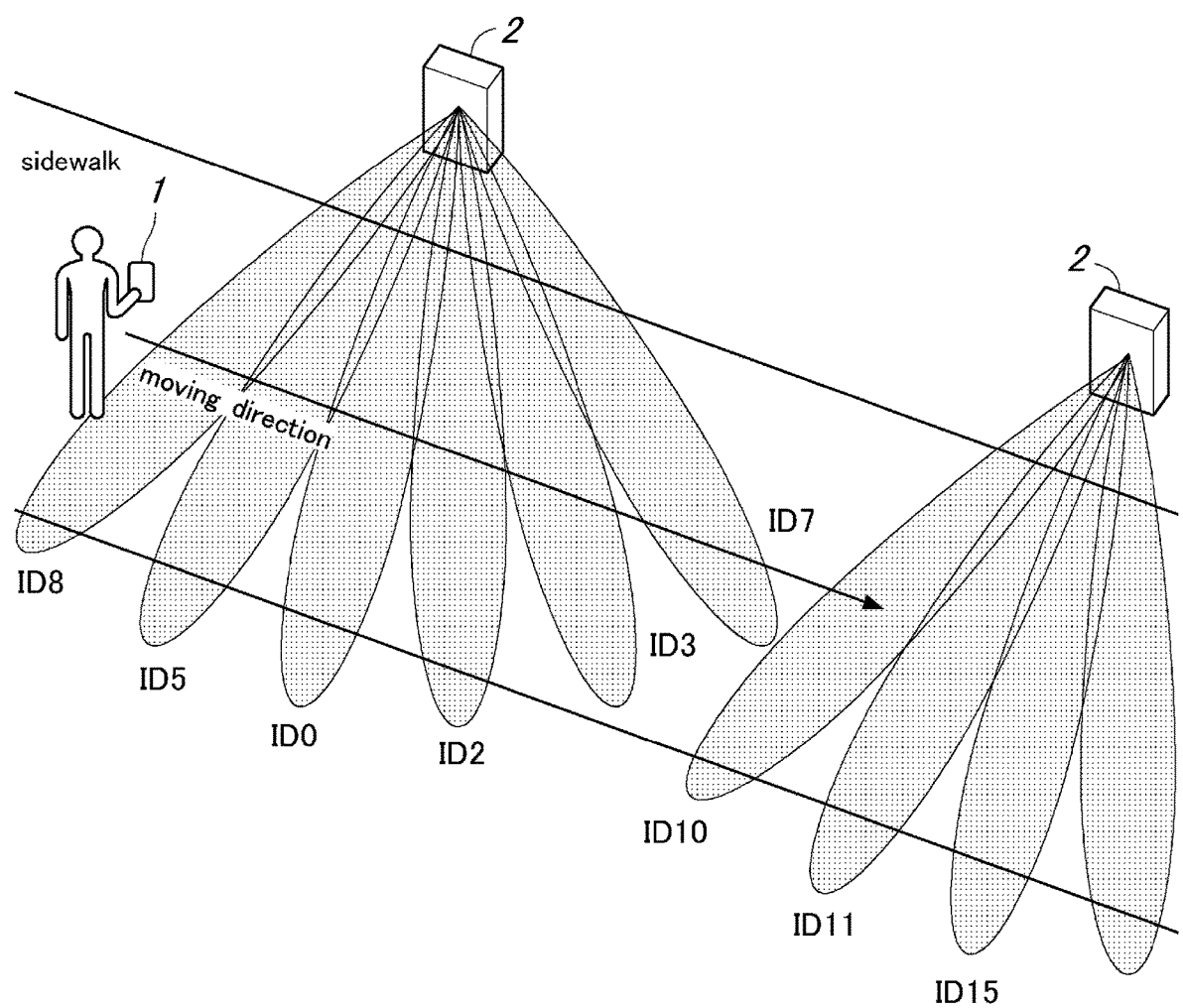
FIG. 15 is an explanatory view showing a situation in which a user terminal 1 and base stations 2 forming respective transmission beams are present according to a fourth embodiment of the present invention.

Next, a fourth embodiment of the present invention will be described. Except for what will be discussed here, this embodiment is the same as the above-described embodiments. Although an exemplary case in which a connection destination of a user terminal 1 is the cellular communication base station 2 will be described here, the discussion about this case similarly applies to a case in which a connection destination of a user terminal 1 is the wireless LAN base station 3. FIG. 15 is an explanatory view showing a situation in which a user terminal 1 and base stations 2 forming respective transmission beams are present.

In an example shown in FIG. 15, a person moves carrying a user terminal 1 moves from the left to the right in the drawing. In this case, when the user terminal 1 uses a transmission beam formed by a base station 2 located behind the person carrying the user terminal 1; that is, located on the rear side of the moving direction (the base station on the left in FIG. 15), the person body can be an obstacle for the user terminal, by which a communication failure can occurs. In this case, the user terminal 1 preferably changes the transmission beam used for communication to a transmission beam formed by the adjacent base station 2 located in front of the person carrying the user terminal 1; that is, located on the front side of the moving direction (the base station on the right in FIG. 15).

In this view, in the present invention, the base station 2 accumulate in the storage 14 historical information on transmission beams used by each user terminal 1 before as historical used-beam information, and the base station 2 sets an offset value so that the user terminal 1 can change the transmission beams used for communication based on the historical used-beam information.

Figure 17:
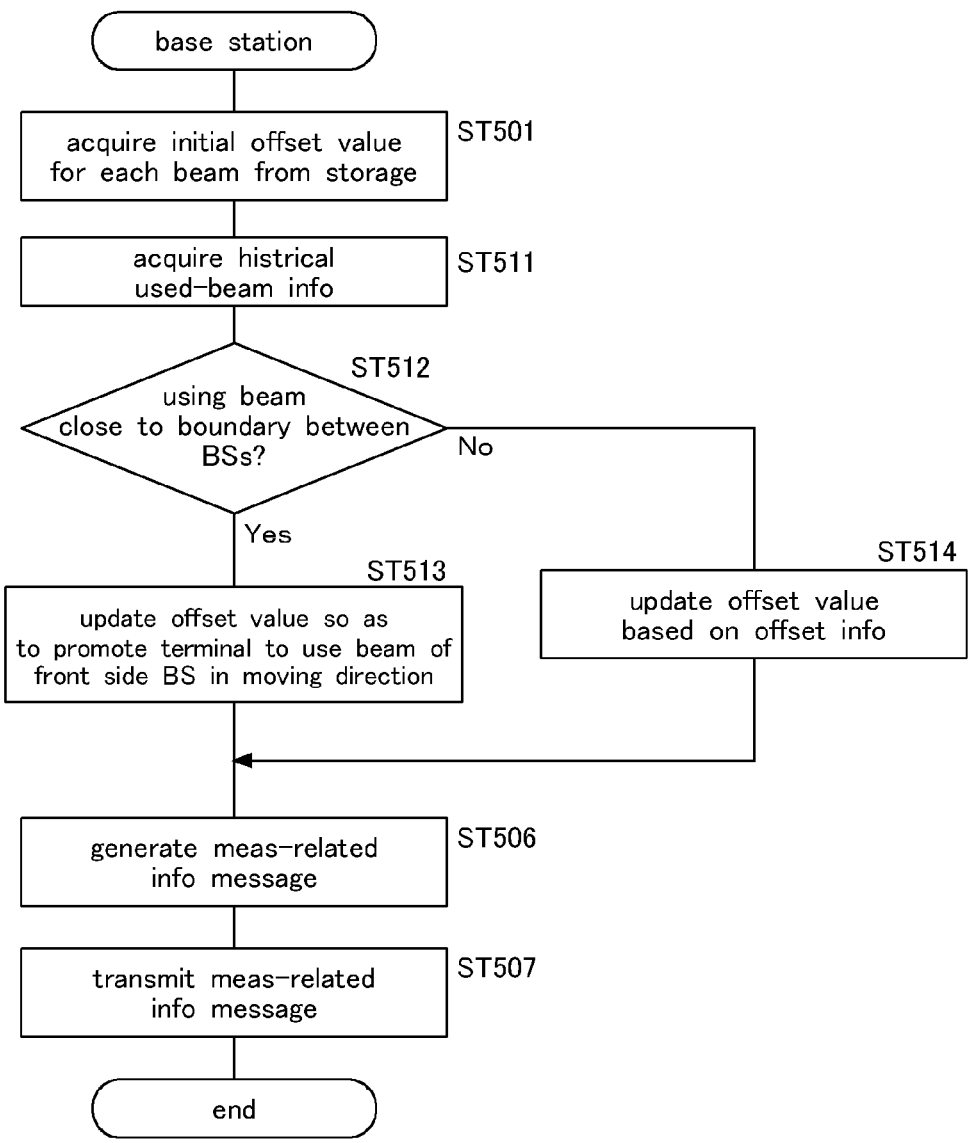
FIG. 17 is a flowchart showing an operation procedure of operations performed by the base station 2 when a user terminal 1 is currently connecting to the base station 2 according to the fourth embodiment of the present invention.

Next, an operation procedure of operations performed by the base station 2 when a user terminal 1 is currently connecting to the base station 2 according to the fourth embodiment of the present invention will be described. FIG. 16 is an explanatory view showing historical used-beam information on transmission beams used before. FIG. 17 is a flowchart showing an operation procedure of operations performed by the base station 2 when a user terminal 1 is currently connecting to the base station 2.

In the base station 2, first, the offset information acquirer 33 acquires an initial offset value for each transmission beam from the storage 14 (ST501). Then, the offset information acquirer 33 acquires historical used-beam information for a target transmission beam in the storage 14 (ST511). The historical used-beam information (see FIG. 16) include a cell ID and a beam ID for each user terminal 1 as a history of transmission beams used by the user terminal 1. FIG. 16 shows an example in which, when the used base station (cell ID) is changed from 1 to 2, the used transmission beam ID transits from 7 to 10.

In this view, in the present invention, the offset information acquirer 33 determines whether or not a target user terminal 1 currently uses a transmission beam formed closest to a coverage of an adjacent base station based on the historical used-beam information of the user terminal (ST512). If the user terminal 1 uses the transmission beam (beam ID: 7) formed closest to a coverage of the adjacent base station (Yes in ST512), the offset information acquirer 33 updates the offset value of a transmission beam with a beam ID of 10 formed by the adjacent base station to a new offset value, which is such an offset value as to promote the user terminal 1 to use the transmission beam (beam ID: 10) formed by the adjacent base station (ST513).

Next, the message controller 34 generates a measurement-related information message (see FIG. 6) including the updated offset value (ST506). Then, the wireless communication device 11 transmits the measurement-related information message to the target user terminal 1 (ST507).

The user terminal 1, based on the offset value included in the measurement-related information message received from the base station 2, corrects an measurement value of received power of the transmission beam (in this case, beam ID: 10) formed by the adjacent base station 2 located on the front side in the moving direction such that the measurement value is corrected to be an increased measurement value of received power. Next, the user terminal 1 generates a measurement-related information message including a corrected measurement value of received power, and transmits the corrected measurement value to the current base station 2. Then, the current base station 2 transmits a beam designation message, which designates the transmission beam (beam ID: 10) formed by the adjacent base station 2, to the user terminal 1 so that the user terminal 1 changes the transmission beam used for communication to the designated transmission beam (beam ID: 10).

If the user terminal 1 does not use the transmission beam closest to the coverage of the adjacent base station (No in ST512), the offset information acquirer 33 updates the offset value of the transmission beam based on offset information in an offset information database stored in the storage 14 (ST514).

In the present embodiment, the user terminal is configured to correct a measurement value of received power in a transmission beam formed by an adjacent base station 2 located in the front side in the moving direction so as to increase evaluation of the transmission beam. However, the user terminal may be configured to correct a measurement value of received power in a transmission beam formed by a currently-connected base station 2 located on the rear side so as to decrease evaluation of the transmission beam, whereby the user terminal 1 is promoted to change the transmission beam used for communication to a transmission beam formed by the adjacent base station 2.

Moreover, in the present embodiment, the currently-connected base station 2 is configured to transmit offset information for a transmission beam formed by an adjacent base station 2 to the user terminal 1. However, a currently-connected base station may be configured such that the base station in cooperation with an adjacent base station 2, promotes a user terminal 1 to use a transmission beam formed by the adjacent base station 2. Specifically, the base station 2 transmits to the adjacent base station 2 an instruction message to change evaluation of a transmission beam of the adjacent base station 2 by using an offset value, so that the adjacent base station 2 transmits offset information for its transmission beam to the user terminal 1.

Fifth Embodiment

Figure 18:
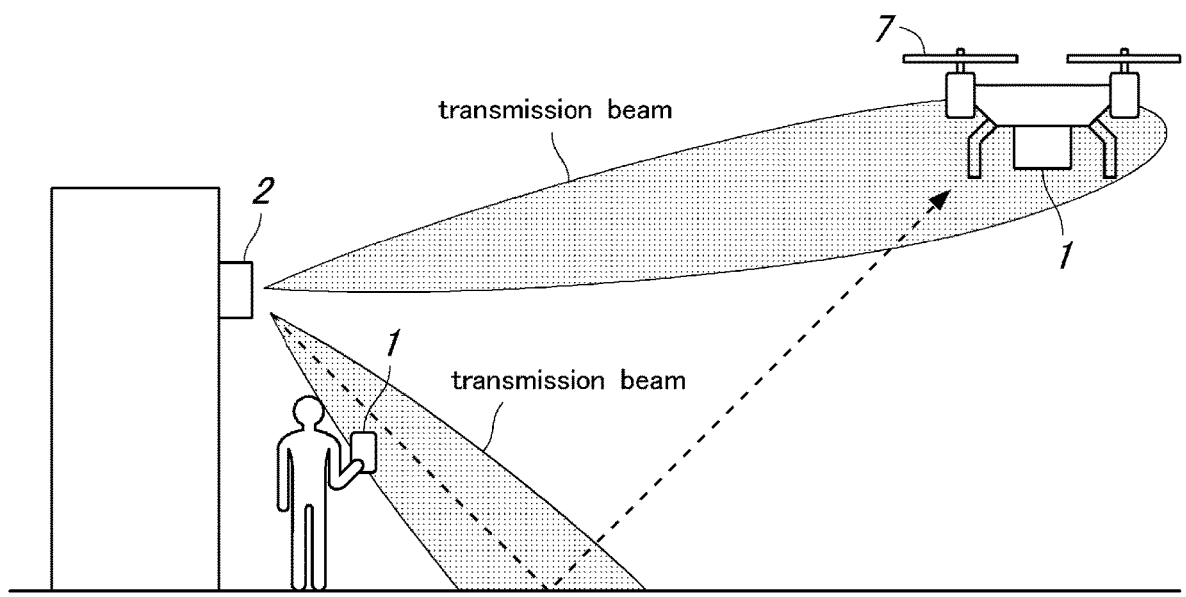
FIG. 18 is an explanatory view showing a situation in which user terminals 1 and a base station 2 forming its transmission beams are present according to a fifth embodiment of the present invention.

Next, a fifth embodiment of the present invention will be described. Except for what will be discussed here, this embodiment is the same as the above-described embodiments. Although an exemplary case in which a connection destination of a user terminal 1 is the cellular communication base station 2 will be described here, the discussion about this case similarly applies to a case in which a connection destination of a user terminal 1 is the wireless LAN base station 3. FIG. 18 is an explanatory view showing a situation in which user terminals 1 and a base station 2 forming its transmission beams are present.

A user terminal 1 mounted on a flying object 7 such as a drone performs communication by using a transmission beam formed by a base station and directed from the base station 2 towards sky. Meanwhile, a transmission beam intended for a moving object on the ground can be reflected by a road surface or a wall surface of a building to be directed towards the sky. In this case, the user terminal 1 mounted on the flying object 7 may find the reflected transmission beam directed towards the sky to start communication by using the reflected transmission beam. Use of such a reflected transmission beam is likely to cause a communication failure due to interference.

In this view, in the present invention, the base station 2 sets an offset value used for changing a measurement value of received power so as to inhibit the user terminal 1 mounted on the flying object 7 from using such a reflected transmission beam directed towards the sky. Accordingly, since the user terminal 1 mounted on the flying object 7 is inhibited from using any reflected transmission beam directed towards the sky, it becomes possible to prospectively avoid a communication failure regarding the user terminal mounted on the flying object.

While specific embodiments of the present invention are described herein for illustrative purposes, the present invention is not limited thereto. It will be understood that various changes, substitutions, additions, and omissions may be made for elements of the embodiments without departing from the scope of the invention. In addition, elements and features of the different embodiments may be combined with each other as appropriate to yield an embodiment which is within the scope of the present invention.

For example, in the above-described embodiments, a cellular communication base station or a wireless LAN base station controls wireless communication performed by a user terminal by using a transmission beam formed by the base station itself, or by using a transmission beam formed by a different base station; that is, an adjacent base station. In other embodiments, a macro cell base station is configured to perform wireless communication using LTE (Long Term Evolution) scheme functioning as a C-plane (Control-plane) cell, and controls wireless communication performed by a user terminal by using a transmission beam formed by a small cell base station as a U-Plane (User-plane) cell; that is, a cellular communication base station in the above-described embodiments.

Also, although, in the above-described embodiments, a measurement value of received power such as RSRP (Reference Signal Received Power) is used as an evaluation indicator for evaluating reception status of a transmission beam in order to select a proper transmission beam, a diffident measurement value may be used as an evaluation indicator to be corrected. In other cases, a measurement value of communication quality of a received transmission beam such as RSRQ (Reference Signal Received Quality) may be used as an evaluation indicator to be corrected. In other embodiments, a combination of a measurement value of received power and a measurement value of communication quality may be used for evaluation in such a manner that both measurement values are corrected.

In addition, although, in the above-described embodiments, a measurement value for a transmission beam is corrected by adding an offset value to or subtracting the same from such a measurement value. Methods of correcting a measurement value for a transmission beam is not limited to the use of subtraction and addition as described above, but may be any method which can correct a measurement value by increasing or decreasing an actual measurement value. For example, a measurement value may be corrected by multiplexing or dividing a measurement value by an offset value.

INDUSTRIAL APPLICABILITY

A base station device, a terminal device, a communication system and a communication control method according to the present invention achieve an effect of making it possible to prospectively avoid occurrence of communication failures and/or reduction in throughput of each terminal device, thereby improving users' satisfaction with communication service, and are useful as a base station device, a terminal device, a communication system and a communication control method for controlling wireless communication performed by the terminal device by using any of multiple transmission beams formed by the base station device.

Glossary 1 user terminal (communication device)
2 cellular communication base station (communication device)
3 wireless LAN base station (communication device)
6 signal control device
7 flying object
11 wireless communication device
13 controller
14 storage
41 wireless communication device
42 controller
43 storage

The invention claimed is:

1. A base station device configured to control wireless communication performed by a terminal device using any of multiple transmission beams formed by the base station device or another base station device, the base station device comprising:
    a wireless communication device configured to wirelessly communicate with the terminal device; and
    a controller configured to acquire correction information including an offset value used for increasing or decreasing a measurement value of received power of each transmission beam at the terminal device and cause the wireless communication device to transmit the correction information to the terminal device so as to thereby promote the terminal device to use a specific transmission beam, or inhibit the terminal device from using the specific transmission beam, wherein, when a communication environment is constant, the controller acquires a fixed offset value, and when the communication environment is determined to be varying, the controller acquires a variable offset value corresponding to the varying environment.

2. The base station device according to claim 1, wherein the controller broadcasts the correction information to all terminal devices present in its coverage area, including one or more terminal devices which are currently not connected to the base station device.

3. The base station device according to claim 1,
wherein the controller selects the terminal device among multiple terminal devices currently performing communication by using the specific transmission beam, and
wherein the selection is made by according to a predetermined condition, and transmits the correction information to the selected terminal device.

4. The base station device according to claim 1,
wherein the multiple transmission beams are placed in a predetermined order and grouped into groups, each group including an equal number of transmission beams, and
wherein the controller acquire the correction information, which include the equal number of transmission beams in a group and a corresponding offset value for one or more measurement values of the transmission beams of each group.

5. The base station device according to claim 1,
wherein the multiple transmission beams are placed in a predetermined order and grouped into groups, each group having a corresponding offset value for one or more measurement values of the transmission beams of the group, and
wherein the controller acquire the correction information which include an ID of a first transmission beam and a number of the transmission beams for each group, and a corresponding offset value for one or more measurement values of the transmission beams of the group.

6. The base station device according to claim 1, wherein the controller determines current congestion status of each transmission beam, and acquires the correction information user for correcting each measurement value so as to inhibit the terminal device from using any transmission beam determined to be in congestion status.

7. The base station device according to claim 1, further comprising a storage for storing correction information used for correcting each measurement value so as to inhibit the terminal device from using any transmission beam which is constantly in a communication environment having a traffic volume above a predetermined value,
wherein the controller is configured to acquire the correction information stored in the storage.

8. The base station device according to claim 1, wherein the controller configured to acquire correction information used for correcting each measurement value so as to inhibit the terminal device from using any transmission beam for which a communication environment deteriorates during a current time of day.

9. The base station device according to claim 1, wherein the controller is configured to acquire correction information used for correcting each measurement value so as to inhibit the terminal device from using any transmission beam for a traffic lane in which an indication of a traffic signal permits traffic to travel based on traffic signal control information.

10. The base station device according to claim 1, wherein the controller is configured to acquire correction information used for correcting each measurement value so as to inhibit the terminal device from using any transmission beam which is directed towards sky by reflection.

11. The base station device according to claim 1, wherein the controller is configured to acquire correction information used for correcting each measurement value such that, when the base station device is located on a rear side of a moving direction of a currently-connected terminal device, the controller promotes the terminal device to use a transmission beam formed by an adjacent base station device located on a front side of the moving direction of the currently-connected terminal device, or inhibits the terminal device from using any transmission beam formed by the base station device.

12. The base station device according to claim 11, further comprising a storage for storing information on past transmission beams used before as historical used-beam information,
wherein the controller is configured to acquire correction information used for correcting each measurement value such that, when the controller determines, based on the historical used-beam information, that the currently-connected terminal device uses a transmission beam formed closest to a coverage of the adjacent base station device, the controller promotes the terminal device to use a transmission beam formed by the adjacent base station device, or inhibits the terminal device from using any transmission beam formed by the base station device.

13. A communication system in which a terminal device performs wireless communication with a base station by using any of multiple transmission beams formed by the base station, wherein the base station comprises:
a wireless communication device configured to wirelessly communicate with the terminal device; and
a controller configured to acquire correction information including an offset value used for increasing or decreasing a measurement value of received power of each transmission beam at the terminal device and cause the wireless communication device to transmit the correction information to the terminal device so as to thereby promote the terminal device to use a specific transmission beam, or inhibit the terminal device from using the specific transmission beam, and
wherein the terminal device comprises:
a terminal wireless communication device configured to wirelessly communicate with the base station device; and
a terminal controller configured such that, when the terminal wireless communication device receives the correction information transmitted from the base station device, the terminal controller corrects a measurement value for evaluating reception status of each transmission beam, and after selection of a transmission beam based on the corrected measurement value, the terminal controller performs wireless communication with the base station device using the selected transmission beam, wherein, when a communication environment is constant, the controller acquires a fixed offset value, and when the communication environment is determined to be varying, the controller acquires a variable offset value corresponding to the varying environment.

14. A communication control method for controlling wireless communication performed by a terminal device by using any of multiple transmission beams formed by a base station, the communication control method comprising:

acquiring, by the base station, correction information including an offset value used for increasing or decreasing a measurement value of received power of each transmission beam at the terminal device and transmitting the correction information to the terminal device so as to thereby promote the terminal device to use, or inhibit the terminal device from using a specific transmission beam; and upon receiving the correction information transmitted from the base station device, correcting, by the terminal device, a measurement value for evaluating reception status of each transmission beam, and after selection of a transmission beam based on the corrected measurement value, the terminal device performing wireless communication with the base station device using the selected transmission beam, wherein, when a communication environment is constant, the base station acquires a fixed offset value, and when the communication environment is determined to be varying, the base station acquires a variable offset value corresponding to the varying environment.

* * * * *